(12) United States Patent
Gabara

(10) Patent No.: US 10,107,893 B2
(45) Date of Patent: Oct. 23, 2018

(54) APPARATUS AND METHOD TO AUTOMATICALLY SET A MASTER-SLAVE MONITORING SYSTEM

(75) Inventor: Thaddeus Gabara, Murray Hill, NJ (US)

(73) Assignee: TrackThings LLC, Murray Hill, NJ (US)

( * ) Notice: Subject to any disclaimer, the term of this patent is extended or adjusted under 35 U.S.C. 154(b) by 1198 days.

(21) Appl. No.: 13/198,748

(22) Filed: Aug. 5, 2011

(65) Prior Publication Data
US 2013/0033363 A1     Feb. 7, 2013

(51) Int. Cl.
*G01S 5/30* (2006.01)
*G08B 21/02* (2006.01)

(52) U.S. Cl.
CPC ............ *G01S 5/30* (2013.01); *G08B 21/0208* (2013.01); *G08B 21/0238* (2013.01); *G08B 21/0272* (2013.01)

(58) Field of Classification Search
CPC . H04L 12/437; G08B 21/023; G08B 21/0208; G08B 21/0238; G08B 21/0272; H04J 3/0664; G10L 15/26; G10L 21/0208; G01S 5/30
USPC ............ 340/539.1, 539.11–539.19, 539.2, 340/539.21–539.25, 539.3; 348/211.1, 348/211.11–211.14, 211.2–211.4; 455/343; 713/320–324
See application file for complete search history.

(56) References Cited

U.S. PATENT DOCUMENTS

| | | | |
|---|---|---|---|
| 2,878,426 A * | 3/1959 | Preli et al. .................... | 361/244 |
| 4,536,887 A | 8/1985 | Kaneda et al. | |
| 5,119,072 A * | 6/1992 | Hemingway .............. | 340/573.1 |
| 5,646,593 A * | 7/1997 | Hughes et al. ............ | 340/573.1 |
| 5,661,460 A * | 8/1997 | Sallen et al. .............. | 340/573.4 |
| 5,689,240 A * | 11/1997 | Traxler ...................... | 340/573.4 |

(Continued)

FOREIGN PATENT DOCUMENTS

JP     2004153732 A  *  5/2004  .............. H04N 7/18

OTHER PUBLICATIONS

Cory D. Kidd, Thomas O'Connell, Kris Nagel, Sameer Patil & Gregory D. Abowd, "Buiiding a Better Intercom: Context-Mediated Communication within the Home", copied from the web on Jul. 13, 2011, 10.1.1.136.4879.pdf.

(Continued)

*Primary Examiner* — Orlando Bousono
(74) *Attorney, Agent, or Firm* — Tyrean Patent Prosecution Law Firm

(57) ABSTRACT

An apparatus is described that can monitor the sounds and voices of infants and children in a house by judicially placing nodes in key locations of the home. The network has intelligence and uses voice recognition to enable, disable, reroute, or alter the network. The network uses voice recognition to follow a child from node to node, monitors the children according to activity and uses memory to delay the voices so the adult can hear the individual conversations. An adult that has been assigned privilege can disable all nodes from any node in the network. Another apparatus can locate an individual by voice recognition or sounds they emit including walking, breathing and even a heartbeat. The sound is detected at several microphones that have a specific positional relationship to a room or an enclosement. Triangulations of the time differences of the audio signal detected by the microphones are used to determine the location or position of the audio source in the room. This information can be used to provide an improved audio delivery system to the individual.

14 Claims, 29 Drawing Sheets

(56) References Cited

U.S. PATENT DOCUMENTS

| | | | |
|---|---|---|---|
| 5,897,667 A * | 4/1999 | Miller et al. | 711/218 |
| 6,094,416 A * | 7/2000 | Ying | 370/222 |
| 6,163,538 A * | 12/2000 | Brown et al. | 370/389 |
| 6,611,860 B1 * | 8/2003 | Ying | 709/208 |
| 6,731,334 B1 * | 5/2004 | Maeng et al. | 348/211.12 |
| 6,839,425 B1 * | 1/2005 | Huang et al. | 379/399.01 |
| 7,006,642 B1 * | 2/2006 | Kumai | 381/119 |
| 7,107,367 B1 * | 9/2006 | Hughes | 710/39 |
| 7,123,402 B1 * | 10/2006 | Doerr et al. | 359/326 |
| 7,389,089 B1 | 6/2008 | Nguyen | |
| 7,554,576 B2 * | 6/2009 | Erol et al. | 348/211.3 |
| 7,577,095 B2 * | 8/2009 | Shay et al. | 370/235 |
| 7,751,597 B2 | 7/2010 | Gabara | |
| 7,894,617 B2 | 2/2011 | Gabara | |
| 7,986,230 B2 | 7/2011 | Gabara | |
| 2002/0138254 A1 | 9/2002 | Isaka et al. | |
| 2002/0173321 A1 * | 11/2002 | Marsden et al. | 455/500 |
| 2003/0013503 A1 * | 1/2003 | Menard et al. | 455/569 |
| 2003/0063003 A1 * | 4/2003 | Bero et al. | 340/573.1 |
| 2003/0156552 A1 * | 8/2003 | Banker et al. | 370/266 |
| 2004/0008719 A1 * | 1/2004 | Ying | 370/460 |
| 2004/0008720 A1 * | 1/2004 | Wang et al. | 370/460 |
| 2004/0008721 A1 * | 1/2004 | Ying et al. | 370/460 |
| 2004/0178906 A1 * | 9/2004 | Vaughan et al. | 340/539.21 |
| 2005/0132420 A1 * | 6/2005 | Howard et al. | 725/135 |
| 2006/0064533 A1 * | 3/2006 | Rael et al. | 710/310 |
| 2006/0074494 A1 * | 4/2006 | McFarland | 700/1 |
| 2006/0253735 A1 * | 11/2006 | Kwak et al. | 714/12 |
| 2007/0036330 A1 * | 2/2007 | Wagner et al. | 379/265.01 |
| 2007/0153774 A1 * | 7/2007 | Shay et al. | 370/352 |
| 2008/0090524 A1 * | 4/2008 | Lee et al. | 455/41.2 |
| 2008/0151792 A1 * | 6/2008 | Taich et al. | 370/294 |
| 2008/0154585 A1 * | 6/2008 | Yoshioka | 704/213 |
| 2008/0212491 A1 | 9/2008 | Gabara | |
| 2008/0256445 A1 * | 10/2008 | Olch et al. | 715/700 |
| 2008/0294276 A1 * | 11/2008 | Nakayama | 700/94 |
| 2009/0180465 A1 * | 7/2009 | Closset et al. | 370/350 |
| 2009/0196016 A1 * | 8/2009 | Massara et al. | 362/86 |
| 2009/0316880 A1 * | 12/2009 | Michaelis | 379/391 |
| 2009/0323977 A1 * | 12/2009 | Kobayashi et al. | 381/71.8 |
| 2010/0008519 A1 * | 1/2010 | Hayakawa et al. | 381/94.1 |
| 2010/0061292 A1 * | 3/2010 | Weinstein | 370/315 |
| 2010/0085419 A1 * | 4/2010 | Goyal et al. | 348/14.09 |
| 2010/0105364 A1 * | 4/2010 | Yang | 455/414.1 |
| 2010/0150162 A1 * | 6/2010 | Nakayama | 370/400 |
| 2010/0158051 A1 * | 6/2010 | Hadzic et al. | 370/503 |
| 2010/0158181 A1 * | 6/2010 | Hadzic | 375/371 |
| 2010/0158183 A1 * | 6/2010 | Hadzic et al. | 375/376 |
| 2010/0169092 A1 * | 7/2010 | Backes et al. | 704/235 |
| 2010/0179812 A1 * | 7/2010 | Jang et al. | 704/244 |
| 2010/0202365 A1 * | 8/2010 | Bambic et al. | 370/328 |
| 2010/0208902 A1 * | 8/2010 | Yoshizawa et al. | 381/56 |
| 2010/0215191 A1 * | 8/2010 | Yoshizawa et al. | 381/94.2 |
| 2010/0219936 A1 | 9/2010 | Gabara | |
| 2010/0225736 A1 * | 9/2010 | King et al. | 348/14.09 |
| 2010/0256972 A1 * | 10/2010 | Grenier | 704/2 |
| 2010/0278223 A1 * | 11/2010 | Riveiro et al. | 375/222 |
| 2010/0305733 A1 * | 12/2010 | Nakayama | 700/94 |
| 2010/0305734 A1 * | 12/2010 | Nakayama | 700/94 |
| 2010/0324894 A1 * | 12/2010 | Potkonjak | 704/235 |
| 2011/0060434 A1 * | 3/2011 | Bowler et al. | 700/94 |
| 2011/0075856 A1 * | 3/2011 | Nakayama | 381/81 |
| 2011/0082957 A1 * | 4/2011 | Hayashita | 710/110 |
| 2011/0135125 A1 | 6/2011 | Zhan et al. | |
| 2011/0176464 A1 * | 7/2011 | Warner et al. | 370/311 |
| 2011/0181415 A1 | 7/2011 | Gabara | |
| 2011/0238830 A1 * | 9/2011 | Giampaolo et al. | 709/224 |
| 2011/0268285 A1 * | 11/2011 | Ohta et al. | 381/58 |
| 2012/0001765 A1 * | 1/2012 | Boccola | G08B 21/24 340/686.1 |
| 2012/0081504 A1 * | 4/2012 | Ng et al. | 348/14.08 |
| 2012/0278759 A1 * | 11/2012 | Curl et al. | 715/804 |
| 2013/0216058 A1 * | 8/2013 | Furuta et al. | 381/71.1 |
| 2014/0169536 A1 * | 6/2014 | Pegg et al. | 379/87 |

OTHER PUBLICATIONS

Kristine S. Nagel, James M. Hudson, Gregory D. Abowd, "Predictors of Availability in Home Life Context-Mediated Communication", copied from the web on Jul. 13, 2011, 10.1.1.80.734.pdf.

Kristine S. Nagel and Gregory D. Abowd. "Challenges in Developing a Context-Aware Family Intercom", copied from the web on Jul. 13, 2011,http://www.cs.umd.edu/hcil/interliving/chi02/nagel.pdf.

* cited by examiner

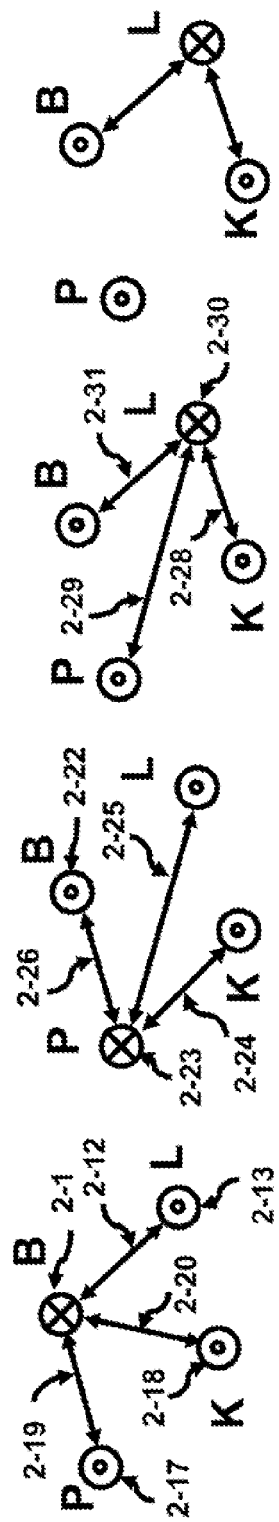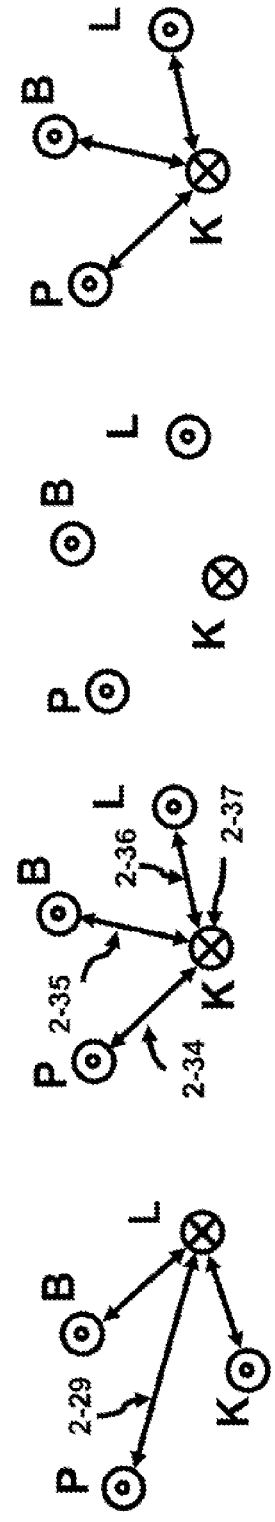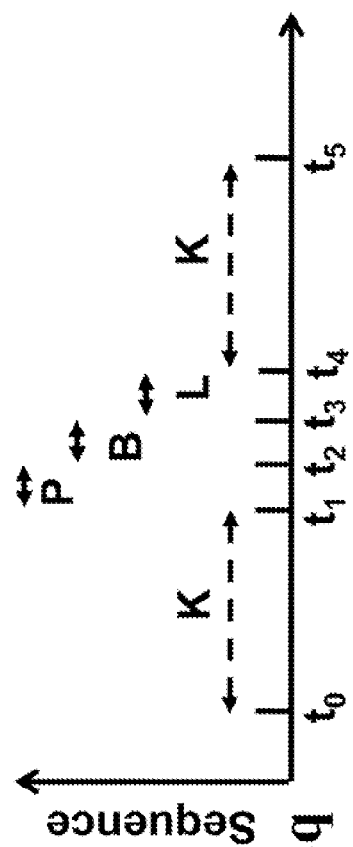

| node | example | master | slave | direction | data | control |
|---|---|---|---|---|---|---|
| ○ | node P 1-5, node K 1-4, node L 1-3 | | x | unidirectional | x | |
| ⊖ | node B 1-2 | x | | unidirectional | x | |
| ⊗ | node B 2-1, node P 2-23, node L 2-30 | x | | bidirectional | x | x |
| ⊙ | node L 2-13, node K 2-18, node P 2-17 | | x | bidirectional | x | x |

FIG. 2r

| link | example | master | slave | direction | data | control |
|---|---|---|---|---|---|---|
| → | link 1-7, link 1-6, link 1-8 | from | to | unidirectional | x | |
| → | link 2-3, link 2-6, link 2-8 | from | to | unidirectional | x | x |
| ↔ | link 2-12, link 2-19, link 2-20 | from/to | to/from | bidirectional | x | x |

FIG. 2s

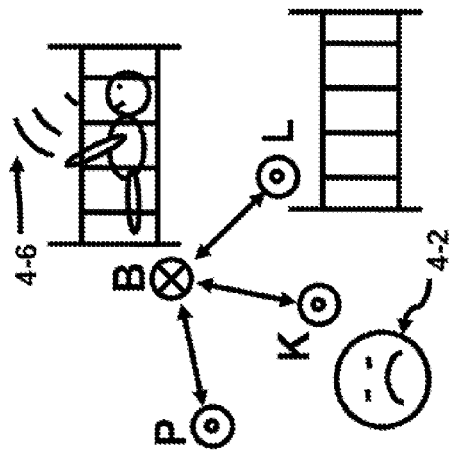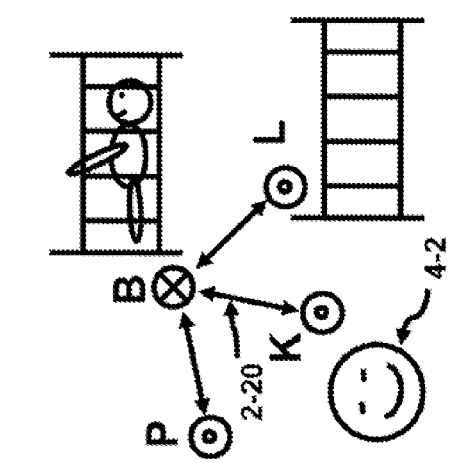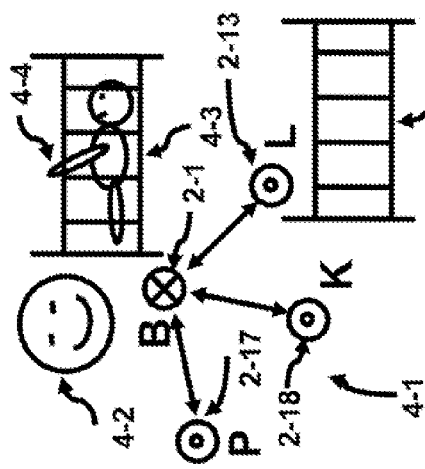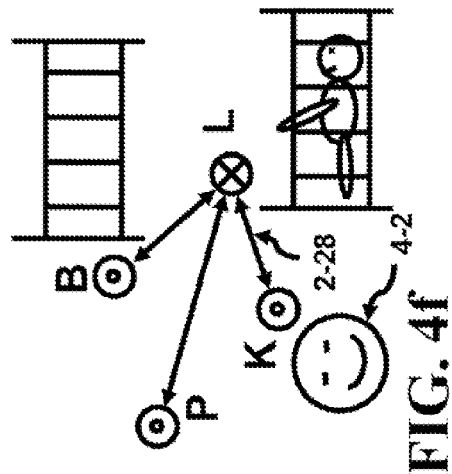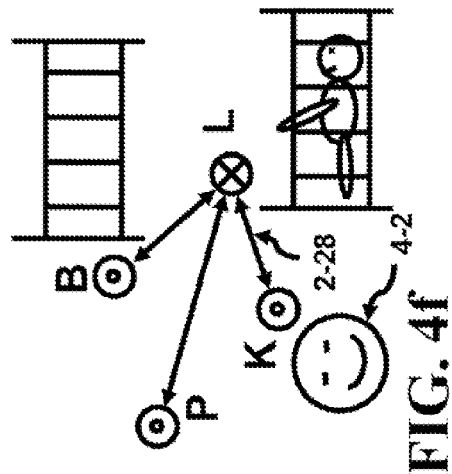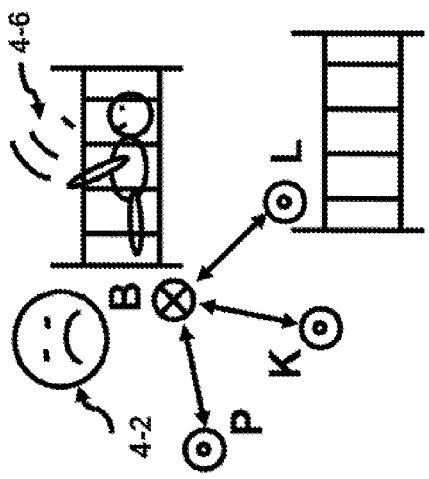

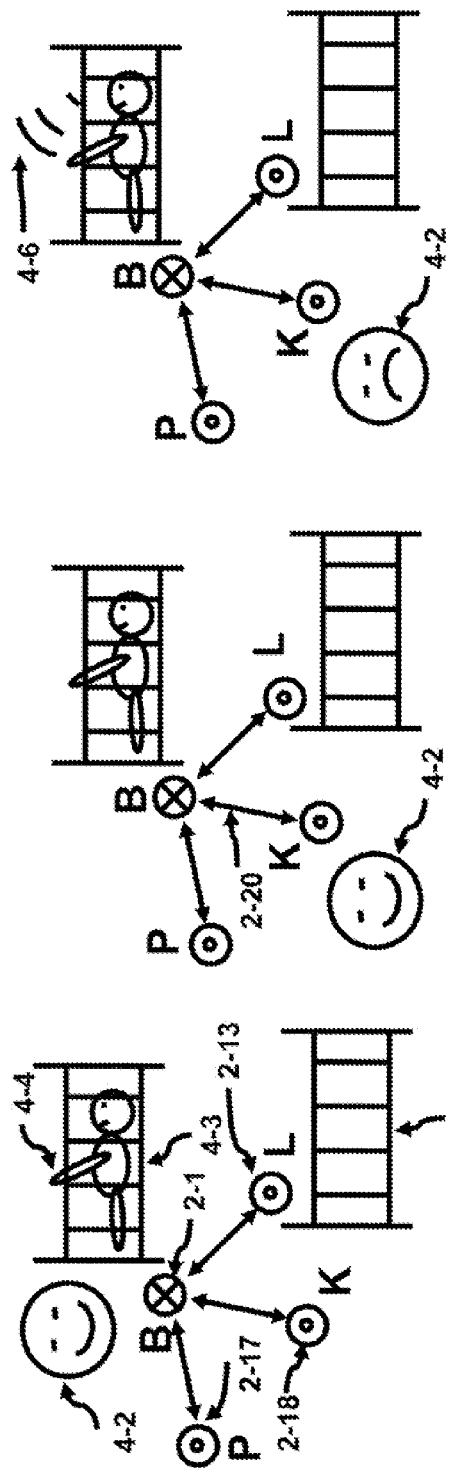

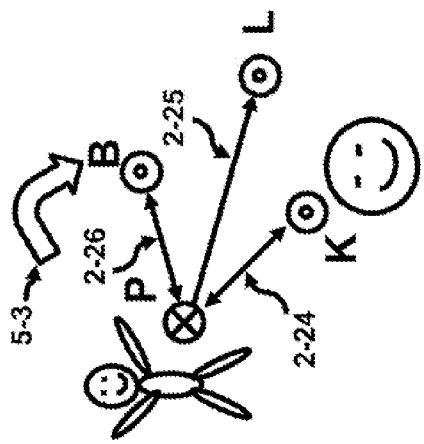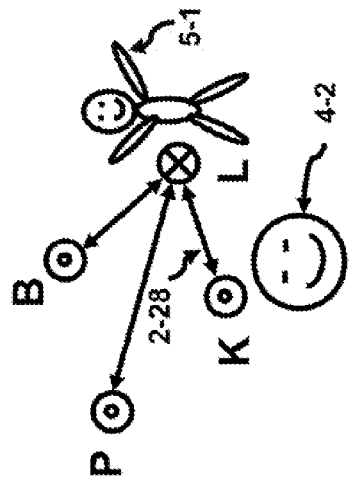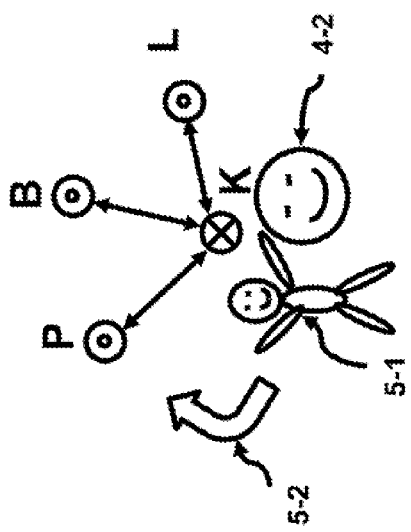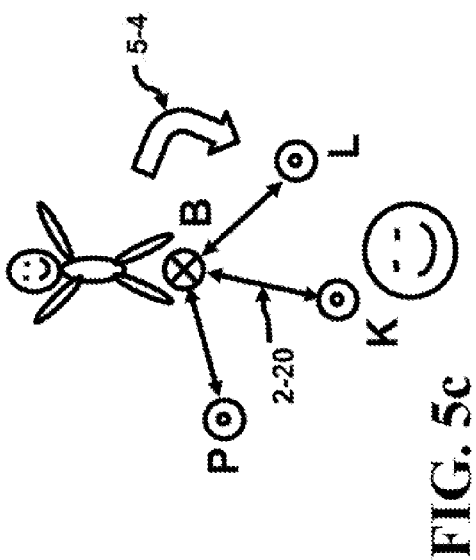
FIG. 5b
FIG. 5d
FIG. 5a
FIG. 5c

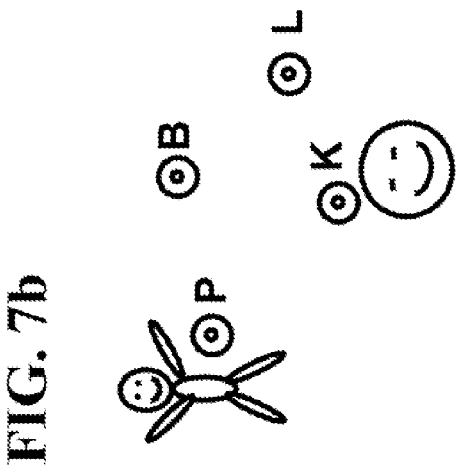
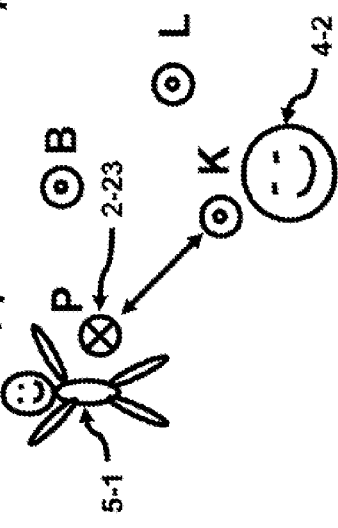
FIG. 7a
FIG. 7b
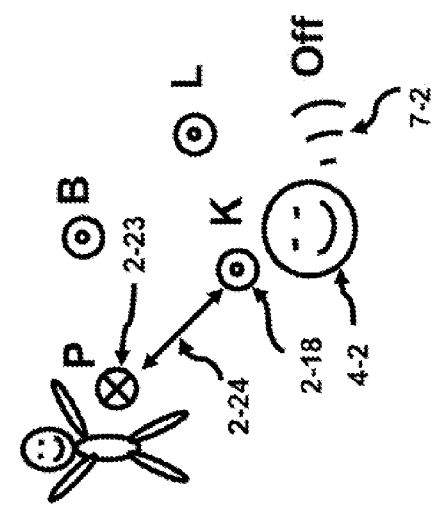
FIG. 7c
FIG. 7d

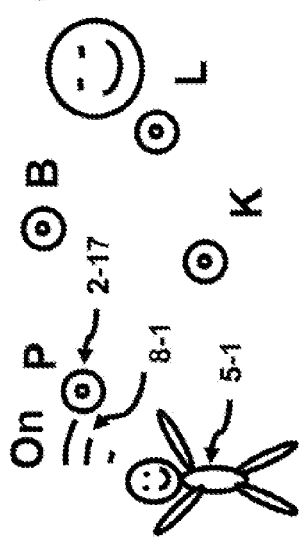
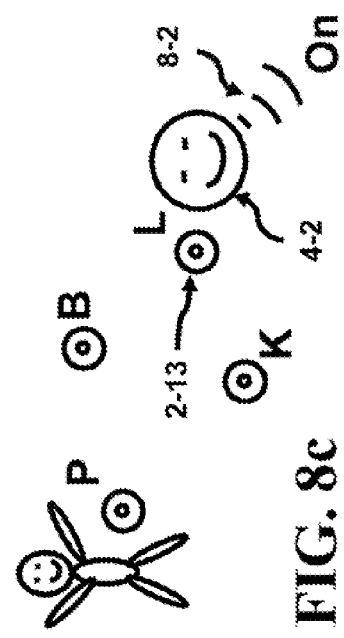
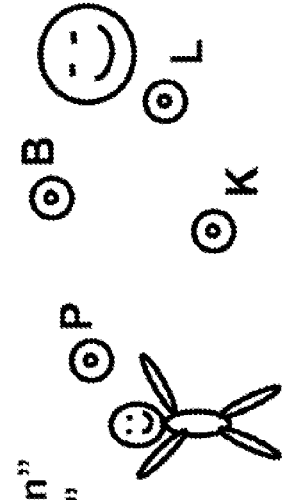
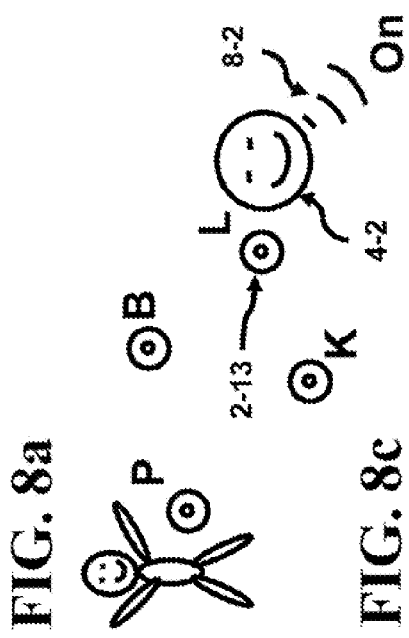
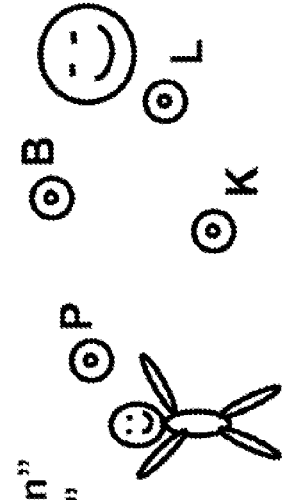

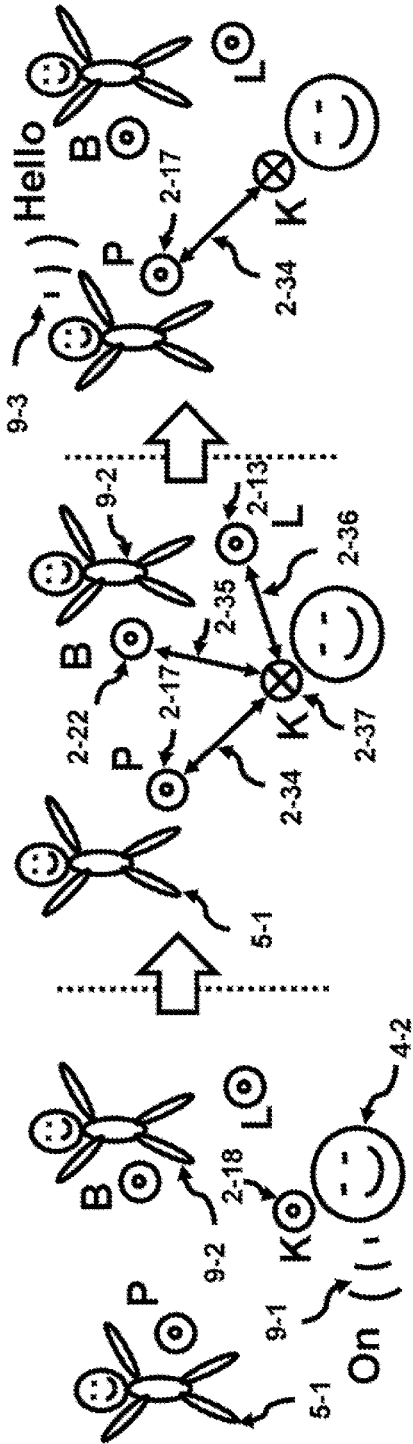
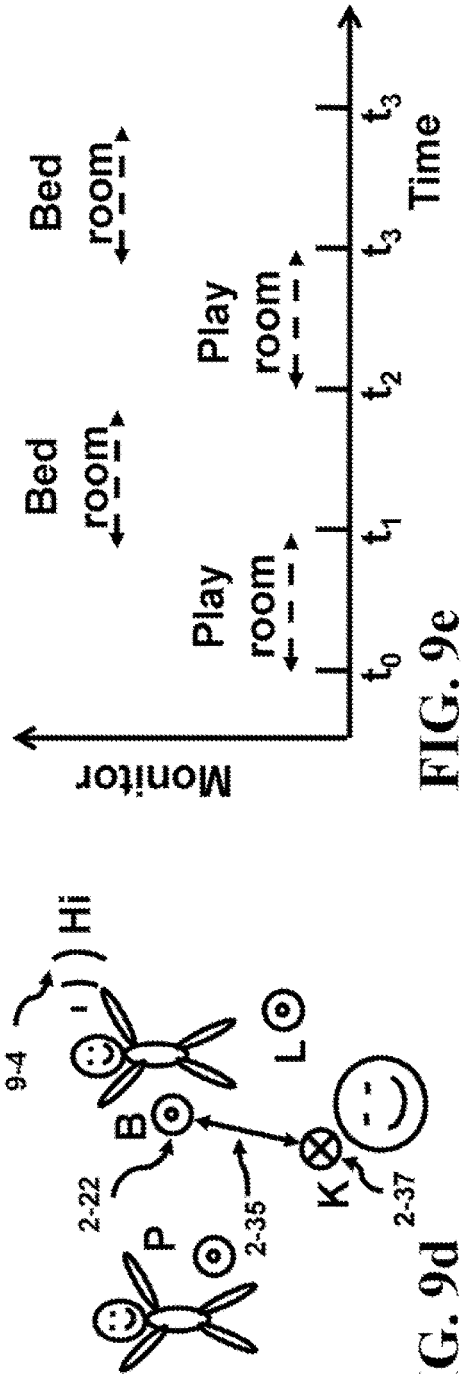

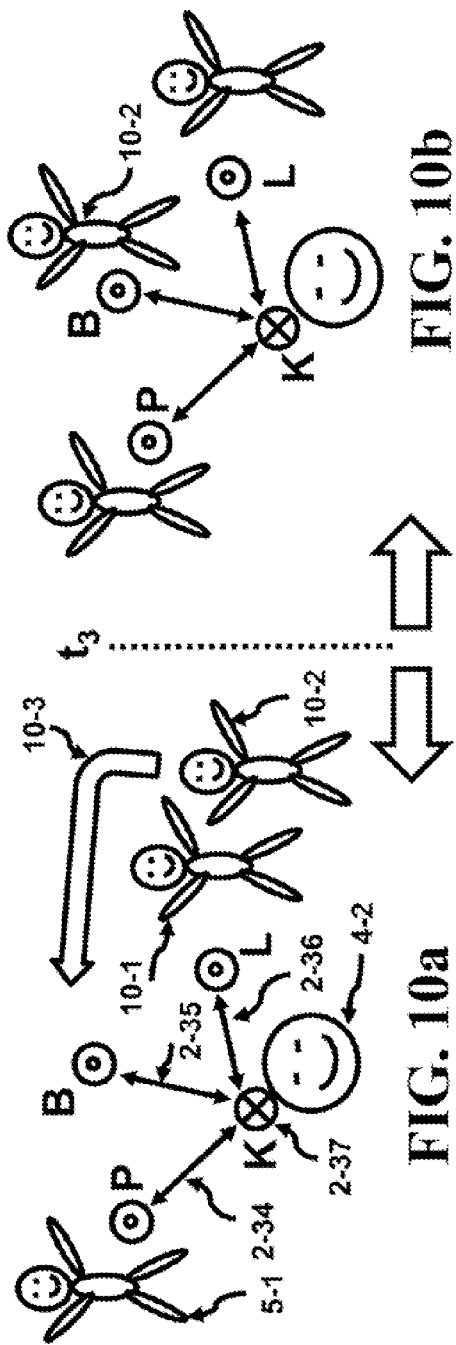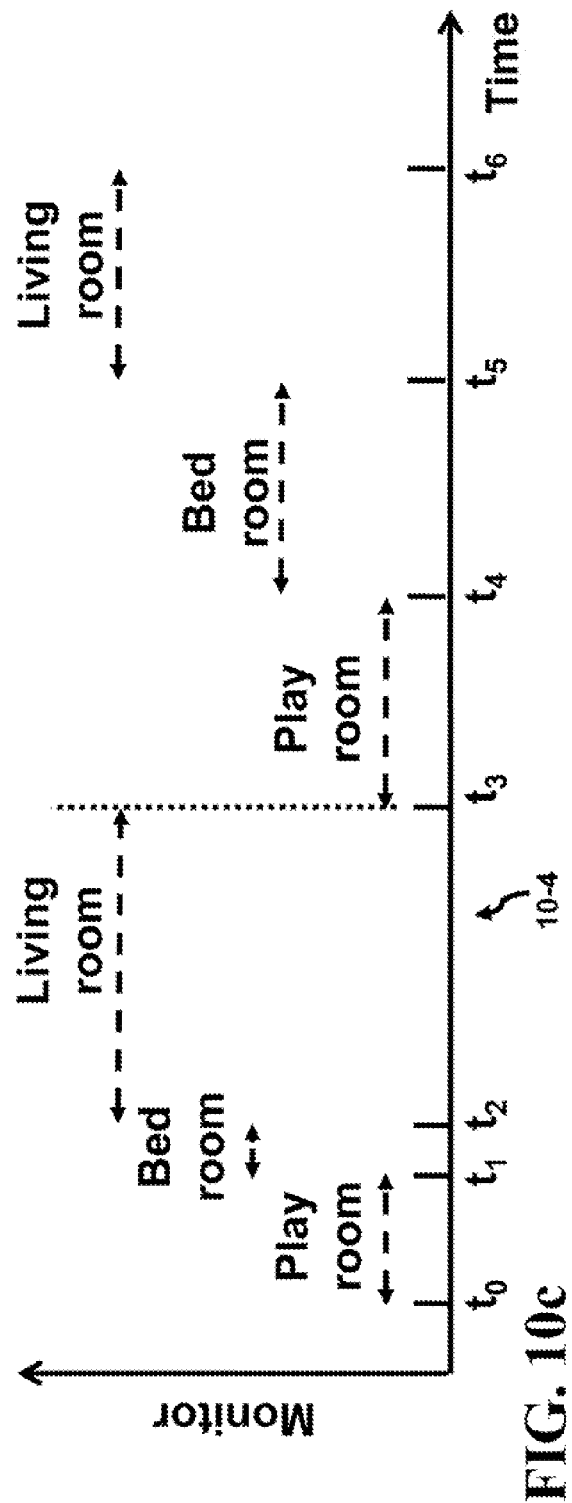

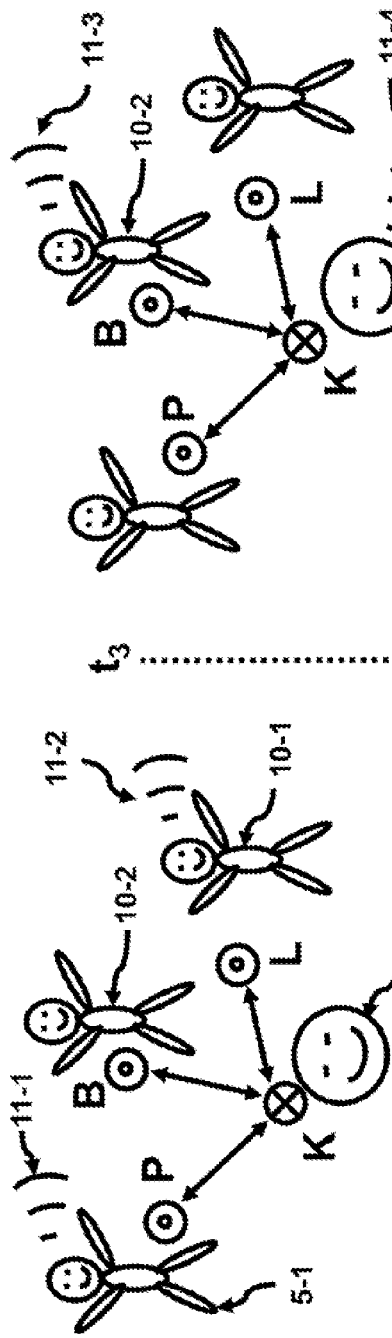
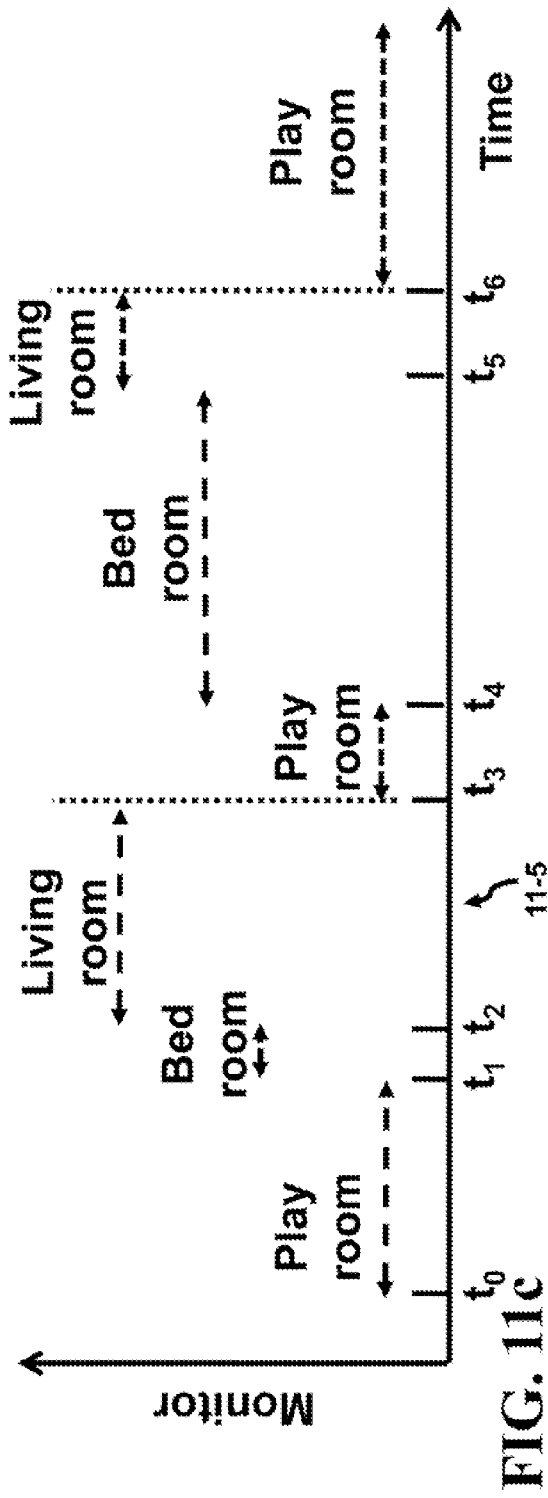
FIG. 11a    FIG. 11b
FIG. 11c

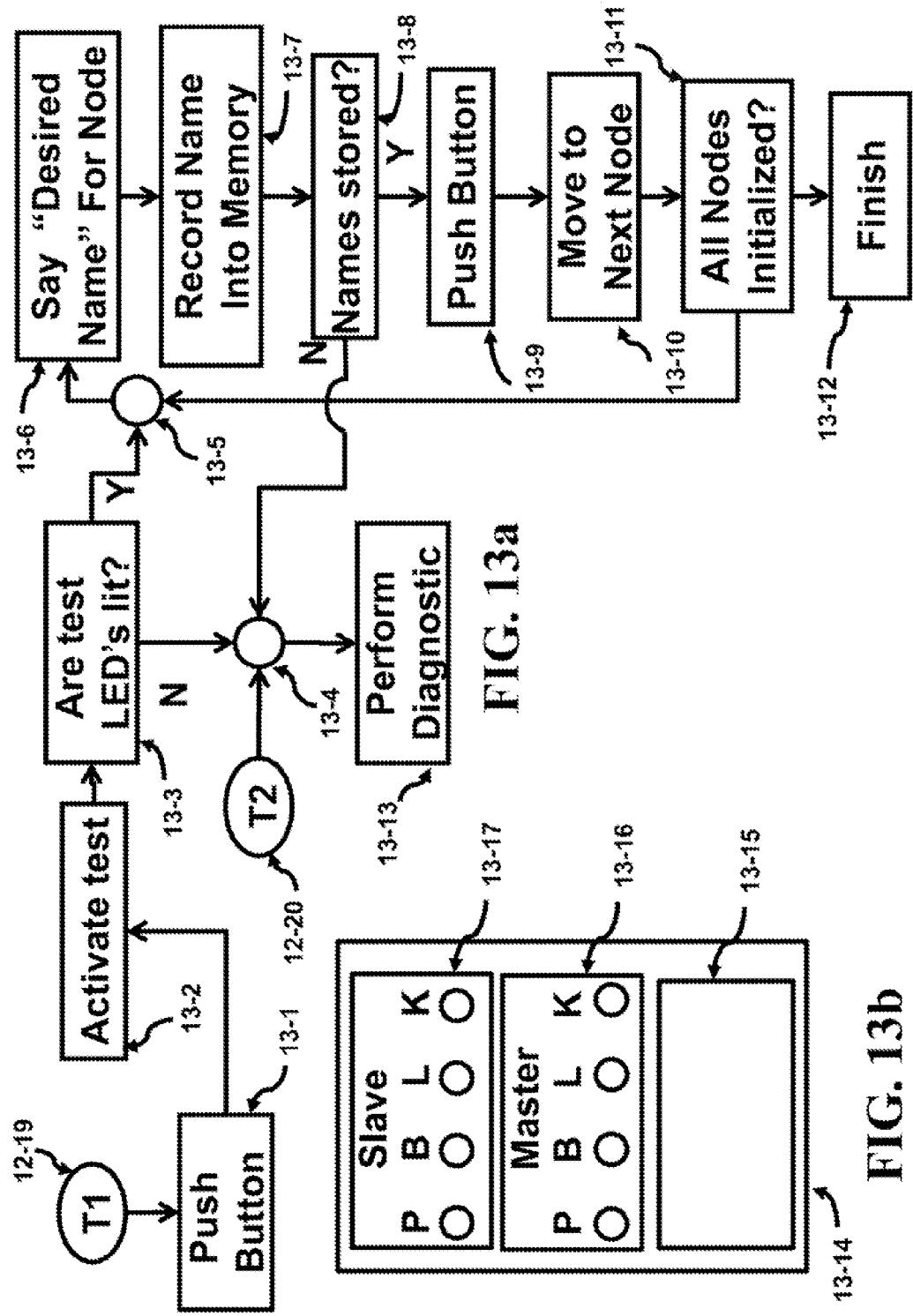

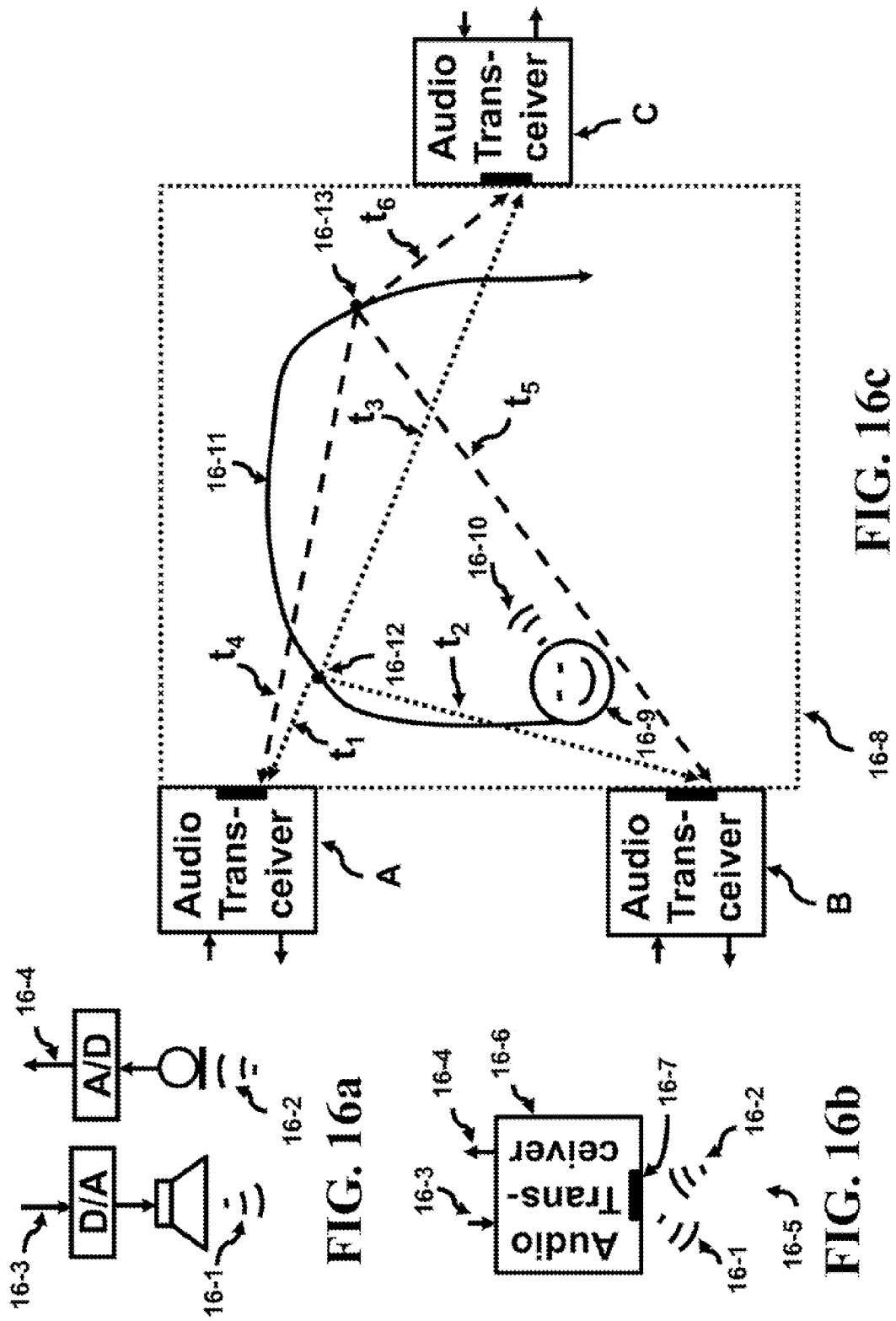

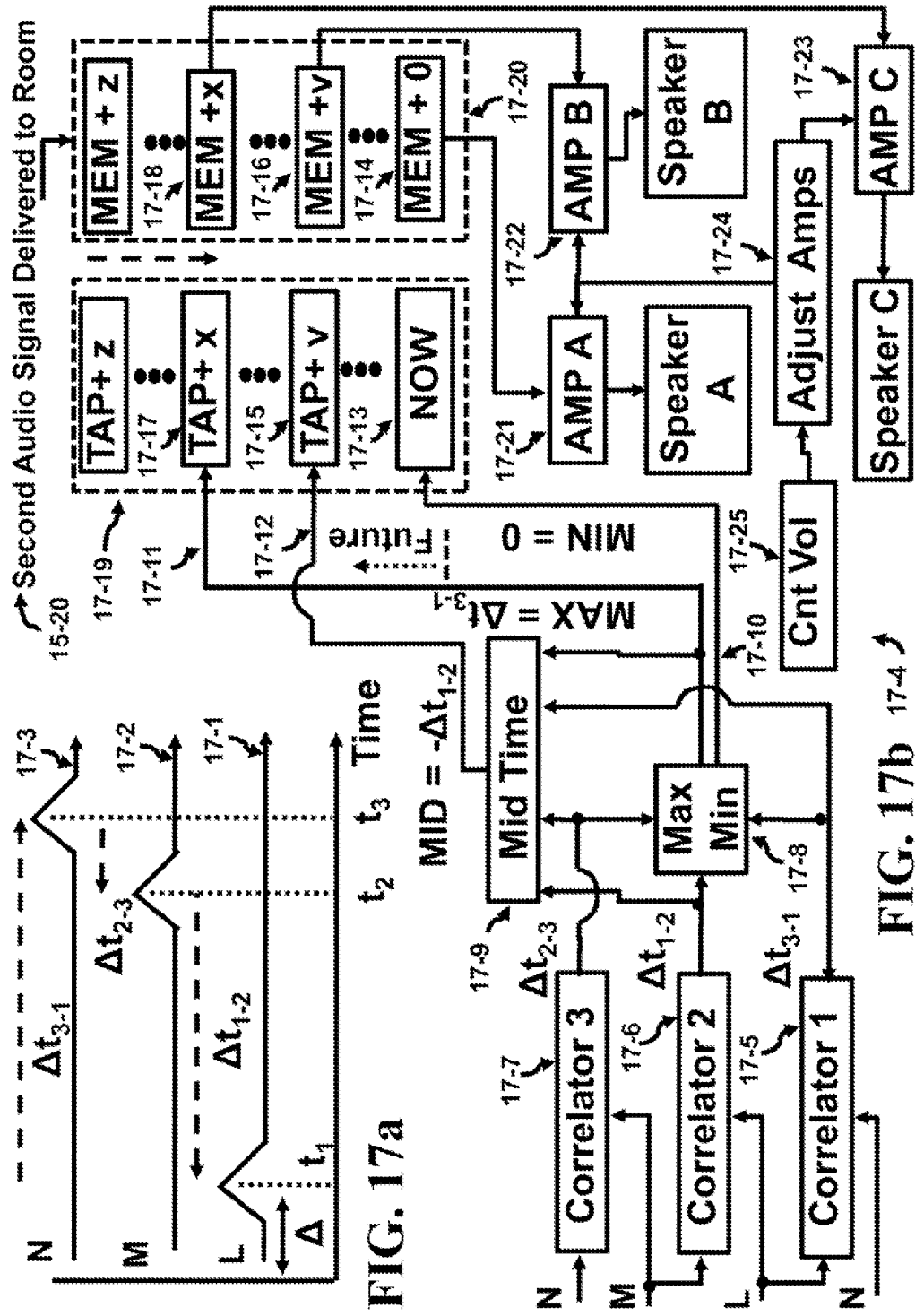

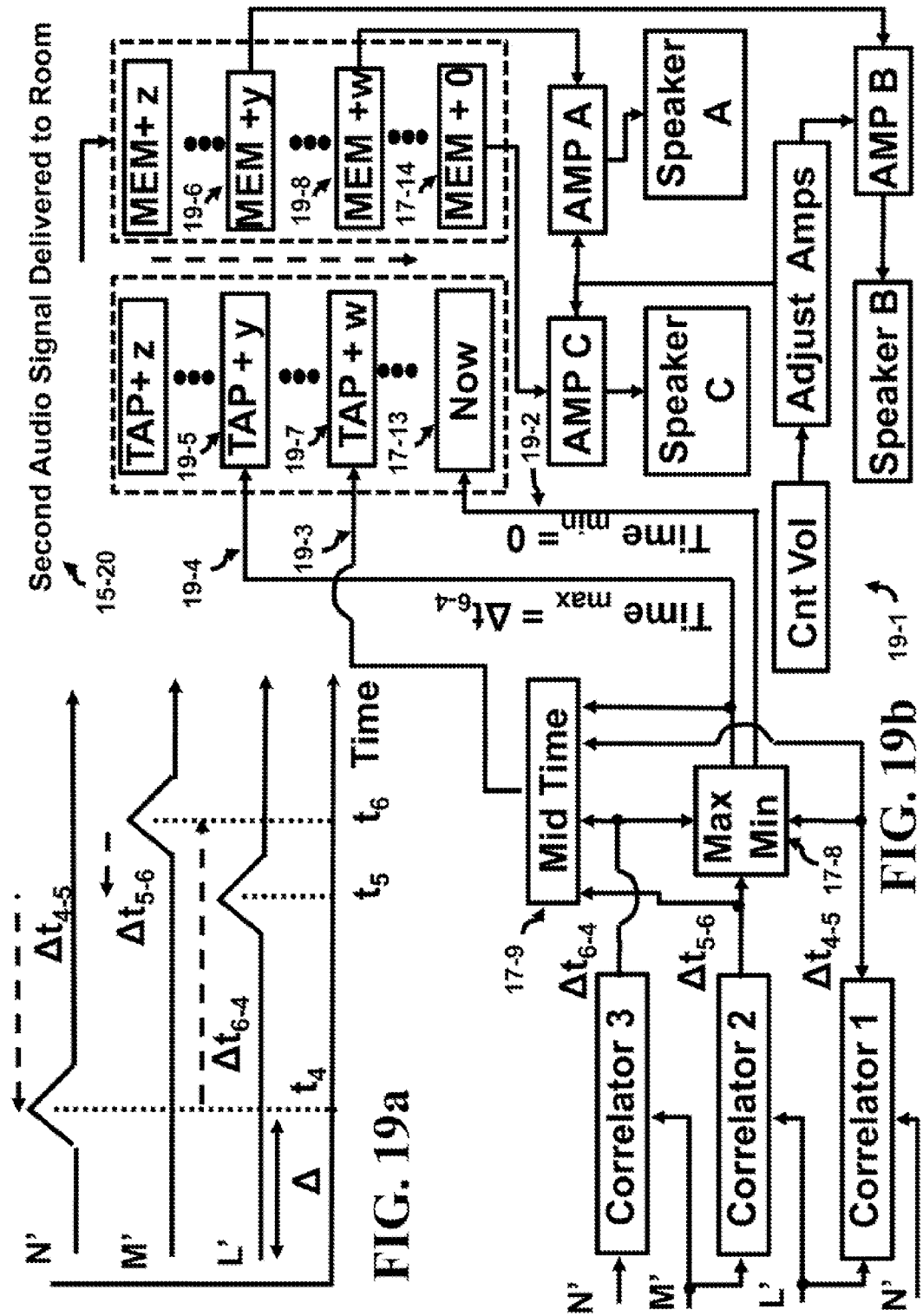

APPARATUS AND METHOD TO AUTOMATICALLY SET A MASTER-SLAVE MONITORING SYSTEM

CROSS REFERENCE TO RELATED APPLICATIONS

The present application is related to the co-filed U.S. application entitled "Apparatus and Method to Locate and Track a Person in a Room with Audio Information", filed on Aug. 5, 2011, which is invented by the same inventor as the present application and incorporated herein by reference in their entireties.

BACKGROUND OF THE INVENTION

A master-slave monitor contains at least one transceiver. A transceiver contains the two basic components: a receiver and a transmitter pair. The receiver and transmitter pair can interface to a medium such as space (or the distance between two locations) either wirelessly, wired, by light, or by sound. One type of master-slave monitor interfaces incoming and outgoing sounds to outgoing and incoming wireless signals, respectively. An antenna provides the wireless interface to insert and extract the wireless signal to/from space. A speaker and microphone are added to the other end to insert and extract the sounds to/from space. This type of master-slave monitor has two transceivers: an audio transceiver on the sound side and a wireless transceiver on the wireless side. Together these electrical components extract an audio signal from space, translate the audio signal to an electrical audio signal, modulate a carrier wave with the audio signal, amplify the signal, transmit the signal into free space, detect the signal using an antenna, amplify the signal, de-modulate the audio signal from the carrier wave and translate the electrical audio signal to an audio signal by a speaker. The signal is provided to/from humans by the use of a speaker and microphone who perceive the contents of the audio signal. A baseband processor at each end can further manipulate the signal. The first master-slave monitor is at one location while two or more master-slave monitors are at other locations. These locations are usually far enough apart and separated by obstacles such that a person at the one location cannot typically be heard by a person in the other location using an unassisted voice, an electrical system is used to allow communication.

A baby monitor provides an uni-directional interconnect. A new baby or infant cries out to indicate to their parents that the infant requires attention. A baby or infant monitoring system is typically used within the confines of the home to monitor the infant in the nursery while the parent is in a different distant room. The basic monitoring system as indicated above includes a transmitter and a receiver. The monitoring system allows a parent to place a sleeping infant into a crib of a nursery with the transmitter and monitor the sounds within the nursery while physically in a different room with the receiver. Whenever the infant starts to cry, the transmitter sends the infant's cries to the receiver in the different room to notify the parent that the infant is in need of attention. An infant or baby monitoring system allows a parent to listen in to the sound in a nursery containing the transmitter and respond to the infant's needs as if the parent were in the nursery.

One of the difficulties of the parent-infant monitor is that as the parent moves around the home, the receiver that listens to the baby remains in one room. The infant cannot be properly monitored when the parent moves out of the room that has the receiver. Often, the parent removes the receiver and transports it to the new location.

Another concern of the parent-infant monitor is that the parent when leaving the new location forgets to take the receiver with them. Now the parent will hear no sounds and thinks the baby is sleeping Another concern of the parent-infant monitor is that the parent would like a private moment but the parent-infant monitor needs to be physically turned off. If the transmitter is disabled, the remaining monitors generate large levels of noise. In this case, all monitors need to be visited and disabled. This condition opens the possibility to forget to enable the parent-infant monitor system. Now the parent will hear no sounds and thinks the baby is sleeping.

Another concern is power dissipation of the monitors in the home. By disabling those units at the various nodes, power dissipation is reduced. In the master-slave monitoring system incorporating a fully enabled transceiver in both the master and slave monitors is that a physical switch needs to be depressed or held as the system is utilized. For example, when person A wants to speak to person B, the talk button is depressed on the nearest transceiver. Another issue is that the voice of the user is sent to all rooms, the message disturbs those who are not interested.

Locating an individual in a room is difficult to do when the individual is not wearing an electronic locating unit. The electronic locating unit provides feedback regarding its current position. However, the object needs to be worn, requires batteries and must also be remembered to be worn. These conditions open the possibility for forgetting to wear it or letting the battery die out. This prevents the ability to locate the individual.

A person who has hearing loss and does not wear any ear aids may need to turn up the volume of electronic equipment such as a TV, radio, stereo, or internet browsing. The increased dB of sound disturbs others or wakes up a sleeping baby. One compromising solution is to turn off the electronic equipment and wait till the sleeping baby awakes or the others have left.

BRIEF SUMMARY OF THE INVENTION

Babies require careful attention particularly when in a crib or confined space. Whenever the baby cries, the master-slave monitoring unit tracks the parent as the parent moves around the home to inform them that the baby is crying and requires attention. In addition, toddlers are very inquisitive and seek out new objects to study as they move around the home. Another embodiment of the invention provides an apparatus and process for toddlers to be monitored as they move about the home. As the toddler moves from a first room to a second room, the monitoring system automatically follows the toddler. Additional embodiments measure the actual position of an individual or toddler in a given room of the home. The location is determined by sounds emanating from the individual such as talking or biometric sounds such as walking, breathing or heart beats. Sound from several speakers is delivered to an individual based on their actual position such that the sound waves reinforce one another.

An intelligent network comprising: a plurality of stationary nodes; a first node is a master node for a first time period; all remaining nodes are a slave node during the first time period; the first node directly communicates in the first time period to each slave node; each slave node communicates in the first time period to the first node; one of the slave nodes is assigned as new master node for a second time period; the first node is assigned the slave node during the second time period; the new master node directly communicates in the second time period to each slave node; and each slave node communicates in the second time period to the new master node, further comprising: any node minimally displaced from a first individual is assigned the master node, whereby any node minimally displaced from the first individual is determined according to relative measured audio power levels, whereby the first individual moves within the intelligent network until a different node minimally displaced from the first individual is reassigned the master node. The intelligent network further comprising: any node minimally displaced from a second individual is assigned to one of the slave nodes, whereby the second individual moves within the intelligent network until a different node minimally displaced from the second individual is reassigned the slave node, whereby the first and the second individuals communicate to each other, whereby the intelligent network tracks the first and second individuals as they move within the intelligent network, whereby the intelligent network uses either voice or sound recognition to track the first and second individuals.

A monitoring system comprising: a plurality of stationary nodes; a first node is a master node minimally displaced from a first individual for a first time period; the first node communicates in the first time period with a second node minimally displaced from a second individual; all remaining nodes are assigned slave nodes during said first time period; a second time period where the first individual moves and becomes minimally displaced from a different node; the different node is assigned the master node for the second time period; the first node is assigned the slave node during the second time period; and the different node communicates in the second time period with the second node, whereby slave nodes without any assigned individuals during the first time or second time periods are placed in a sleep mode, whereby the system is responsive to voice commands from the first individual. The monitoring system further comprising: the first individual with a privilege to place all nodes into a sleep mode, whereby all normal communications are ceased.

A monitoring system comprising: a plurality of individuals; a plurality of nodes where one node is a master node and all remaining nodes are slave nodes during a first time period; a first individual is minimally displaced and assigned to the master node; each remaining individual is assigned their minimally displaced node in the first time period; each slave node assigned with at least one individual in the first time period communicates with the master node; and each occupied node is monitored over the first time period proportional to a number of individuals at the occupied node divided by a summation of all individuals at all occupied slave nodes, further comprising: the system is responsive to voice commands from any individual with a privilege whereby the individual with the privilege verbally places all nodes into a sleep mode, whereby the individual with the privilege verbally places all nodes into an enabled mode, further comprising: memory to store concurrent voices from occupied nodes, whereby the first time period terminates when a moving individual is assigned a different minimally displaced node, whereby the intelligent network uses either a HomePlug specification or a IEEE 1901 powerline standard protocol to send control data over a powerline.

BRIEF DESCRIPTION OF THE DRAWINGS

Please note that the drawings shown in this specification may not be drawn to scale and the relative dimensions of various elements in the diagrams are depicted schematically and not necessary to scale.

FIG. 1c presents a single link in the network of FIG. 1a.

FIG. 2i-p presents several network configurations illustrating this inventive technique.

FIG. 2q depicts one time sequence illustrating this inventive technique.

FIG. 2r shows a table describing the node symbols of this inventive technique.

FIG. 2s shows a table describing the link symbols of this inventive technique.

FIG. 4a-f depicts a sequence of events that alters the network in accordance with the present invention.

FIG. 4g-i depicts a sequence of events that alters the network in another perspective in accordance with the present invention.

FIG. 5a-d illustrates network following the child throughout the house using sound recognition allowing the adult to listen from any of the rooms illustrating this inventive technique.

FIG. 7a-b depicts the network where the child attempts but fails to verbally shut the network off illustrating this inventive technique.

FIG. 7c-d illustrates the network where the adult verbally shuts the network off in accordance with the present invention.

FIG. 8a-b shows the network where the child attempts but fails to verbally enable the network in accordance with the present invention.

FIG. 8c-f depicts the network where the adult verbally enables the network from any location in accordance with the present invention.

FIG. 9a illustrates the network where the adult verbally enables the network illustrating this inventive technique.

FIG. 9b shows the network where the network assesses if the other rooms have children illustrating this inventive technique.

FIG. 9c-d depicts the network where the rooms having sounds of the children time share the network illustrating this inventive technique.

FIG. 9e illustrates the equal time sharing between the two rooms illustrating this inventive technique.

FIG. 10a shows the network time sharing between all the rooms and providing time periods in first half of FIG. 10c depending on number of children in rooms illustrating this inventive technique.

FIG. 10b depicts the network time sharing between all the rooms after child repositioning and providing time periods in second half of FIG. 10c that is equally partitioned bases on children numbers illustrating this inventive technique.

FIG. 10c depicts providing time periods in its first half (left side) depending on number of children in rooms showing the network time sharing between all the rooms in FIG. 10a, while providing time periods in second half (right side) of FIG. 10c that is equally partitioned bases on children numbers showing the network time sharing between all the rooms in FIG. 10b illustrating this inventive technique.

FIG. 11a illustrates the network time sharing between all the rooms and providing time periods in first half of FIG. 11c depending on the voice activity of children in rooms illustrating this inventive technique.

FIG. 11b shows the network time sharing between all the rooms after a silent child starts to speak and providing time periods in second half of FIG. 11c that depends on the voice activity of a child in one of the rooms illustrating this inventive technique.

FIG. 11c depicts providing time periods in first half (left side) depeding on the voice activity of children in rooms showing the network time sharing between all the rooms in FIG. 11a, while providing time periods in second half (right side) depending on the voice activity of children in rooms showing the network time sharing between all the rooms in FIG. 11b illustrating this inventive technique.

FIG. 13a illustrates the remainder of the flowchart of initializing unit in accordance with the present invention.

FIG. 13b shows an interface unit illustrating this inventive technique.

FIG. 16a-b illustrates the audio transceiver and block diagram illustrating this inventive technique.

FIG. 16c shows the tracking of an adult illustrating this inventive technique.

FIG. 17a shows the audio time diagrams at the microphones illustrating this inventive technique.

FIG. 17b depicts a system to locate an individual in a room or location and deliver audio to the individual in accordance with the present invention.

FIG. 19a shows the audio time diagrams at the microphones illustrating this inventive technique.

FIG. 19b depicts a system to locate an individual in a room or location and deliver audio to the individual in accordance with the present invention.

DETAILED DESCRIPTION OF THE INVENTION

Figure 1A:
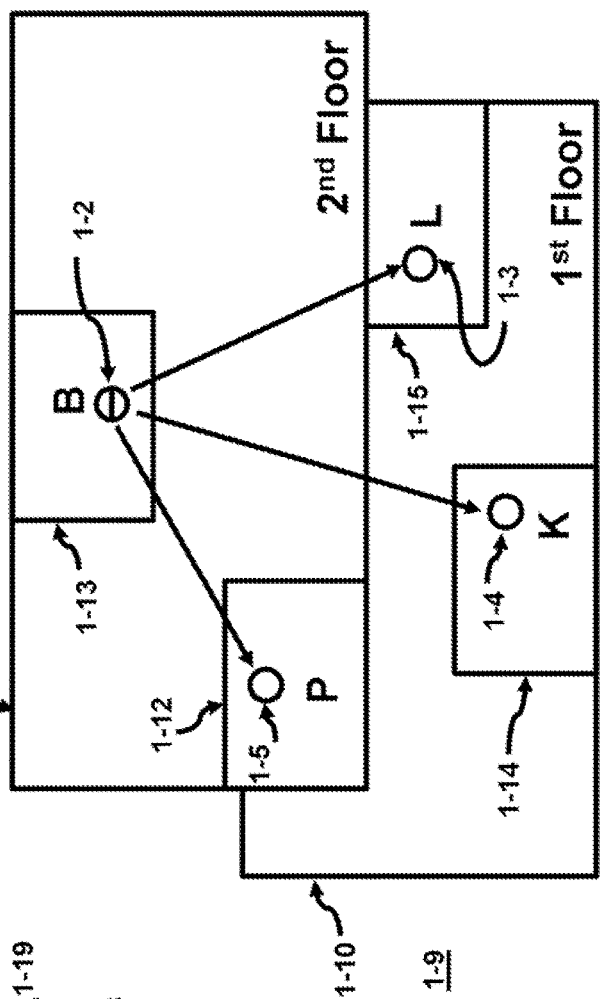
FIG. 1a shows a network of a single transmitter and multiple receivers.
Figure 1B:
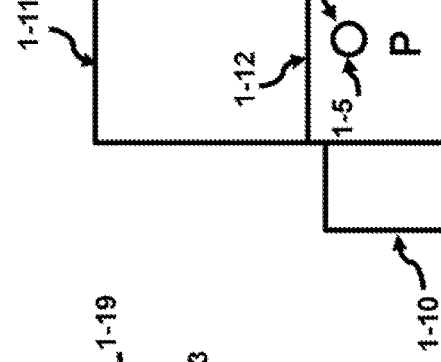
FIG. 1b depicts the network of FIG. 1a placed in a home.

FIG. 1a illustrates a broadcast network 1-1. The master node 1-2 named B 1-18 (hereinafter called "node B 1-2" after drooping the 1-18 numerical label to B and associating name B with the node) is a transmitter and sends information through a unidirectional link 1-6 to the slave node 1-5 named P 1-20 (hereinafter called "node P 1-5" after dropping the 1-20 numerical label to P and associating name P with the node) which is a receiver, the master node B 1-2 sends information through unidirectional link 1-8 to slave node 1-4 named K 1-21 (hereinafter called "node P 1-4" after dropping the 1-21 numerical label to K) which is a receiver and the master node B 1-2 sends information through unidirectional link 1-7 to slave node 1-3 named L 1-19 (hereinafter called "node P 1-4" after drooping the 1-19 numerical label to L) which is a receiver. Similar naming conventions apply to the remaining nodes and links in the specification. The information carried on the unidirectional links 1-6 to 1-8 can be identical or individualized. FIG. 1b illustrates floor plan 1-9 of the placement of node B 1-2 into a Bedroom 1-13 of a 2nd floor 1-11, the node E 1-5 into the Playroom 1-12 on the 2nd floor, the node L 1-3 into the Living room 1-15 of the first floor 1-10 and the node K 1-4 into the Kitchen 1-14 of the first floor 1-10. Thus, the infant can be located in any of these four rooms and if the infant is crying or in need of help, an adult will be able to react.

Figure 1C:
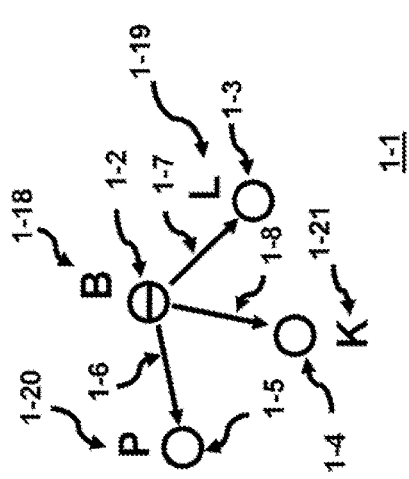
Figure 1D:
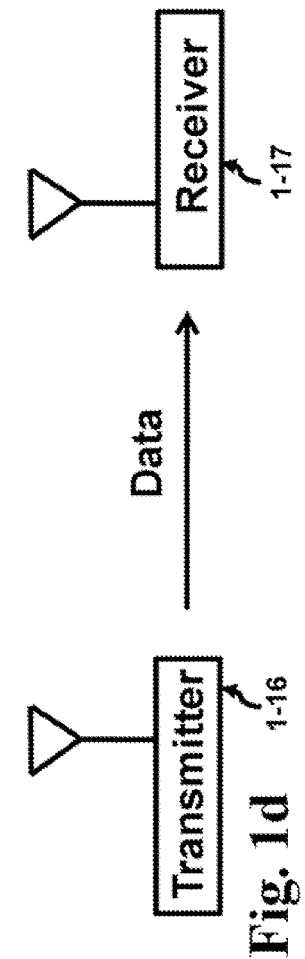
FIG. 1d shows the block diagram of the network of FIG. 1c.

FIG. 1c presents a uni-directional single link 1-7 where only data is carried between the node B 1-2 and the node L 1-3. FIG. 1d illustrates the block diagram of the transmitter 1-16 in node B and the link carrying data and the receiver 1-17 in the node L.

Figure 2A:
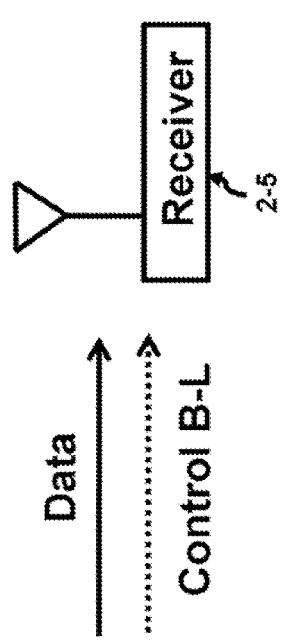
FIG. 2a illustrates a uni-directional single link carrying data and control illustrating this inventive technique.
Figure 2B:
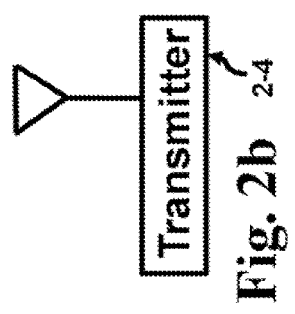
FIG. 2b shows the block diagram of the network of FIG. 2a illustrating this inventive technique.

FIG. 2a depicts a uni-directional single link 2-3 coupling the node B 2-1 (this time with an additional output) to the node 1, 2-2. FIG. 2b illustrates the block diagram that shows those enabled components of a master-slave monitor such as the transmitter 2-4 in node B, the link carrying data and control B-L to the receiver 2-5 in the node L. FIG. 2c illustrates a broadcast network formed between the node B and the three nodes P 1-5, K 1-4 and L 1-3. The information carried on the links 2-6 to 2-8 can be identical or tailored to each different node. For instance, FIG. 2d-f depicts three different types of networks using only two of the three available links. The third link is temporally disabled. The control B-L, B-K and B-P are used to setup these networks.

Figure 2G:
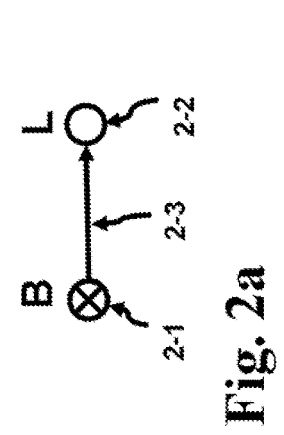
FIG. 2g depicts a dual link with a bi-direction data flow with control in both directions illustrating this inventive technique.
Figure 2D:
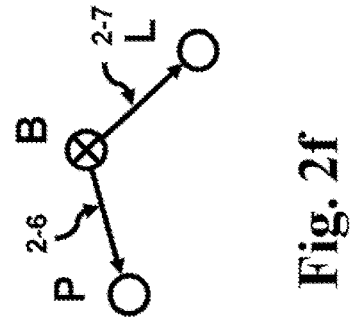
FIG. 2c-f presents several network configurations illustrating this inventive technique.
Figure 2E:
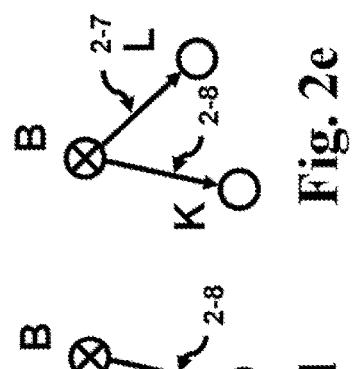
Figure 2C:
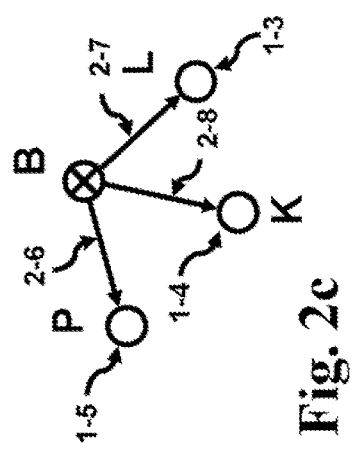
Figure 2F:
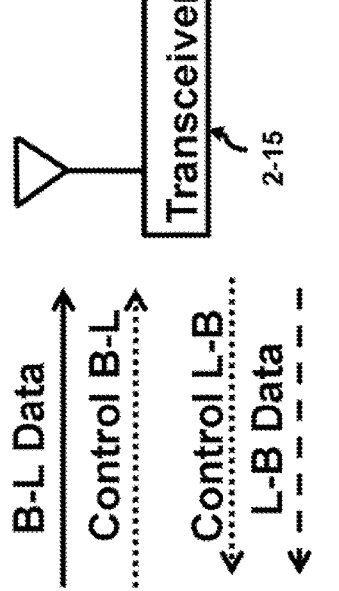
Figure 2H:
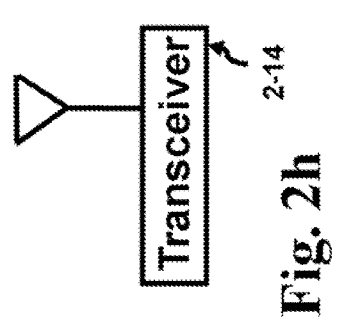
FIG. 2h shows the block diagram of the network of FIG. 2g illustrating this inventive technique.

FIG. 2g illustrates a bi-directional link 2-12 between master node 2-1 represented by the circle with the X and slave node 2-13 represented by the circle with an internal circle. The master node 2-1 has the transceiver 2-14, fully enabled in this case, in FIG. 2h which sends data and control from node B to node L. The slave node 2-13 has the transceiver 2-15 which sends data and control from node L to node B. The direction of the arrow of the link 2-12 corresponds to the B-L Data and the control B-L information flowing from left to right and the L-B Data and the control L-B information flowing from right to left. The master and slave effectively switch places if the receiver that was disabled is enabled while the corresponding transmitter is disabled and the transmitter that was disabled is enabled while the corresponding receiver is disabled.

The need to have a master node is more apparent when the multi-node network in FIG. 2i is viewed. In this link, the node B 2-1 is assigned the master while the remaining nodes P 2-17, K 2-18 and L 2-13 are assigned as slaves. The links 2-19, 2-20 and 2-12 coupling the slaves to the master nose are bidirectional in both data and control.

The control L-B and control B-L can be sent over the power wire within the house using the HomePlug specification and the IEEE 1901 powerline standard over the powerline instead of being wirelessly transferred. Thus, the data can be sent wirelessly while the control can be sent over the power lines. If the data consists of a lower bandwidth data such as voice (as compared to video, for example) then wireless transfer can be eliminated since data and control can be coupled through the power lines which also power the nodes.

The bi-directionality of the data and control allows the entire network to be reconfigurable. For example, in FIG. 2i, master node B communicates directly with slave nodes P, K and L. Note that slave node L does not communicate directly with the slave node P, although slave node L communicates indirectly with slave node P through master node B. Node B has three independent links 2-19, 2-20 and 2-12 to the slave nodes P 2-17, K 2-18 and L 2-13, respectively. Node B directly communicates to the slave nodes over a dedicated link. Similarly, the slave nodes directly communicate to the master node over the same dedicated link. Another possibility is for node B to issue commands to nodes P, K and L that node P will be assigned the master node. All nodes in the network are aware that the master node will be reassigned. At a set time, the network illustrated in FIG. 2j is established. Now, node P 2-23 is the master node who communicates with nodes K, L and B 2-22 on the bidirectional links 2-24, 2-25 and 2-26, respectively. Similarly, node P issues commands to the network that node L will be assigned the master node 2-30 as depicted in FIG. 2k and node L is reassigned the master node and communicates with nodes B, P and K on the bidirectional links 2-31, 2-29 and 2-28, respectively. In FIG. 2l, the bidirectional link 2-29 illustrated in FIG. 2k is placed in sleep mode by a voice command issued to master node L and wirelessly transferred from the master node L to node P.

Each of the nodes contains a core component and a shell component. When the node is enabled, both core and shell components are enabled allowing full access and operation of the node. However, in sleep mode, the node maintains the core component operational, while the shell component is temporally disabled. For example, the core can contain the voice recognition element and all elements to enable an RF receiver to pass voice commands wirelessly from the other nodes to the core, while the shell can contain the elements that allow transmission of signals from the node either wirelessly or by the speakers. A node set to sleep would only be listening and can be set to listen for only a fraction of the time to save further power.

Before this network is changed to another configuration, the link 2-29 needs to be re-established as illustrated in FIG. 2m. The node K is assigned to be the master node 2-37 and communicates with nodes P, B and L on the bidirectional links 2-34, 2-35 and 2-36, respectively. In FIG. 2o, all links are disabled, while in FIG. 2p the links are reestablished.

FIG. 2q illustrates the master node K in FIG. 2n sending data and control to anodes P, B and L between $t_0$ and $t_1$. Also the master node K is sending data and control to nodes P, B and L between $t_4$ and $t_5$. However, master node K listens to node P between $t_1$ and $t_2$, node B between $t_2$ and $t_3$ and to node L between $t_3$ and $t_4$. The data that node K sends to all the nodes can be sounds generated in the Kitchen, for example, while the node K hears the activity at nodes P, B and L, corresponding to the Playroom, Bedroom and Living room, respectively.

A recap of the symbols used in this specification are illustrated in the tables of FIG. 2r and FIG. 2s. In FIG. 2r, the first row provides the node symbol, examples, if node is a master or slave node, whether node carries unidirectional or bidirectional information, and if this information contains data or control. The second row shows the symbol of a circle with examples of node P 1-5, node K 1-4, etc., this symbol is a slave carrying unidirectional flow of data. The third row shows the symbol of a circle having a horizontal bisector line with an example of node B 1-2, this symbol is a master carrying unidirectional flow of data. The fourth row shows the symbol of a circle having an X with examples of node B 2-1, node P 2-23, etc., this symbol is a master carrying bidirectional flow of both data and control. The fifth row shows the symbol of a circle having a smaller radius circle internally with examples of node L 2-13, node K 2-18, etc., this symbol is a slave carrying bidirectional flow of both data and control.

In FIG. 2s, the first row provides the link symbol, examples, if link carries information from/to the master node to/from the slave node, whether link carries unidirectional or bidirectional information, and if this information contains data or control. The second row shows the symbol of an arrow with examples of link 1-7, link 1-6, etc., this symbol carries unidirectional flow of data from the master node to the slave node. The third row shows the symbol of an arrow with an example of link 2-3, link 2-6, etc., this symbol carries unidirectional flow of data and control from the master node to the slave node. The fourth row shows the symbol of an arrow with examples of link 2-12, link 2-19, etc., this symbol carries bidirectional flow of data and control from/to the master node to/from the slave node.

Figures 3A, 3B:
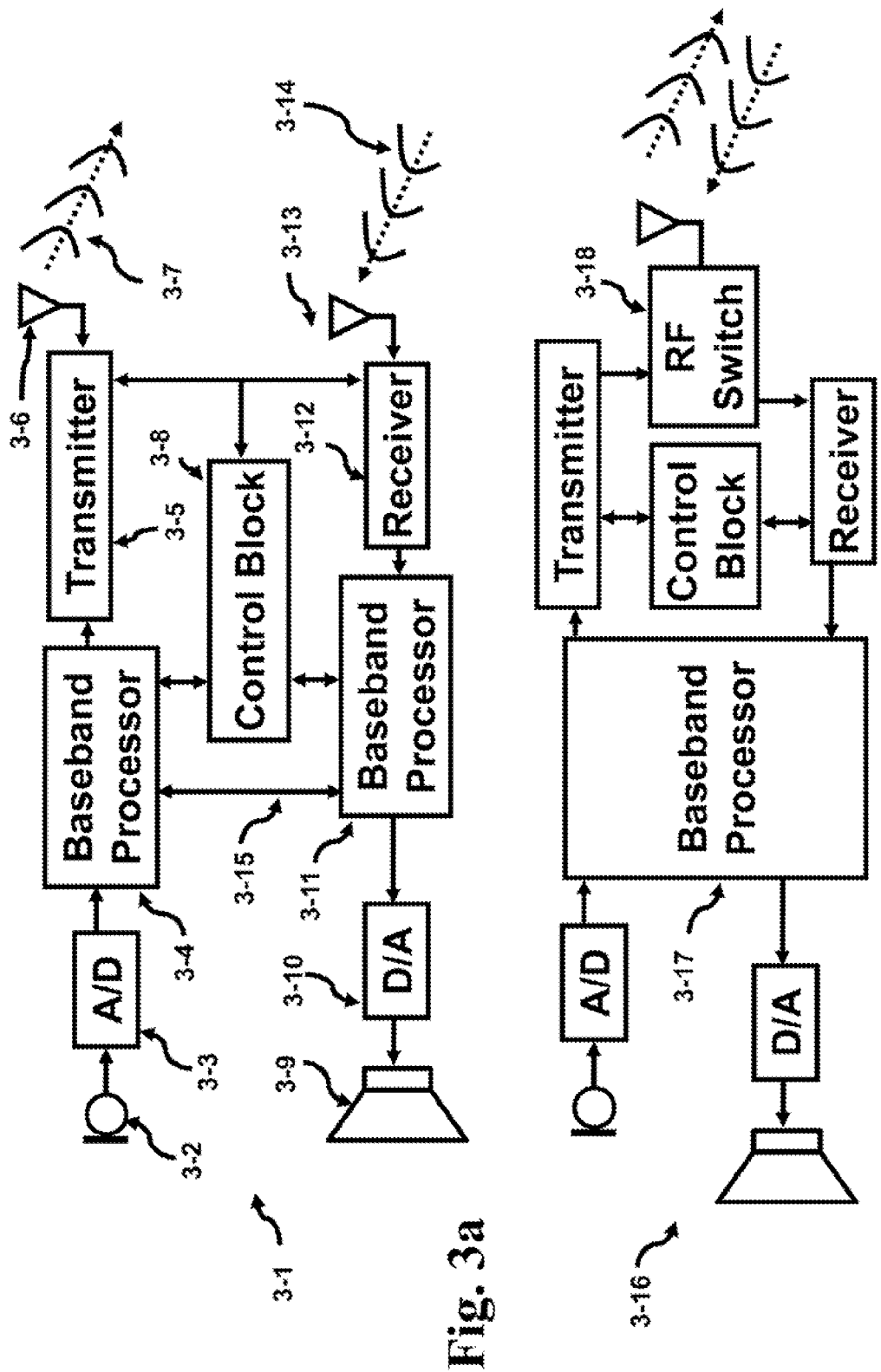
FIG. 3a illustrates a block diagram of the bi-directional transmitter/receiver illustrating this inventive technique.
FIG. 3b shows a block diagram of the half-duplex data flow with control in both directions illustrating this inventive technique.

FIG. 3a illustrates a transceiver 3-1 that operates uplink 3-7 and downlink 3-14 simultaneously by using two separate wireless channels. This transceiver interfaces incoming and outgoing wireless signals with outgoing and incoming audio signals. A microphone 3-2 picks up sound and applies the sound to the A/D 3-3, the A/D (Analog to Digital) outputs to a baseband processor 3-4 controlled by a control block 3-8. The output of the baseband goes to the transmitter 3-5 to drive the antenna 3-6. The downlink signal 3-14 is captured by the antenna 3-13 and applied to the receiver 3-12. The baseband processor 3-11 operates on the data and applies the data to the D/A (Digital to Analog) 3-10 which then applied the analog signal to the speaker 3-9. The baseband processors 3-4 and 3-11 performs loopbacks of the audio signal or of the wireless links via interconnect 3-15. Thus, a wireless signal 3-14 comes into the transceiver and will loopback over interconnect 3-15 and be sent back as the wireless signal 3-7. The unit also contains a processor for speech recognition and verification of user's voice although not shown as well as other blocks that are required to operate a system similar to this one; memory, control, DSP (Digital Signal processor), ALU (Arithmetic Logic Unit), etc.

As the speaker and microphone are placed closer together, positive feedback can become an issue. Several techniques are utilized to help overcome this concern. One is for the microphone to be operational while the speaker is disabled and vice versa which is time division multiplexing, scheme; thus only one of the two is enabled breaking the feedback loop. Another is to utilize electronic design to minimize this effect by using filters, yet another is to place a greater distance between the speaker and the microphone by inserting a vertical barrier between the two and another is to separate the two as much as possible while still remaining within the design tolerances of the system design. Any one or any combination can be used given the system design specifications.

FIG. 3b depicts another transceiver 3-16. The uplink and down links are shared by the RF switch 3-18. The RF switch either drives the antenna or listens to the antenna. The baseband processor 3-17 can be common to both paths. This wireless interface needs to share the bandwidth of a single channel.

Figures 3C, 3D:
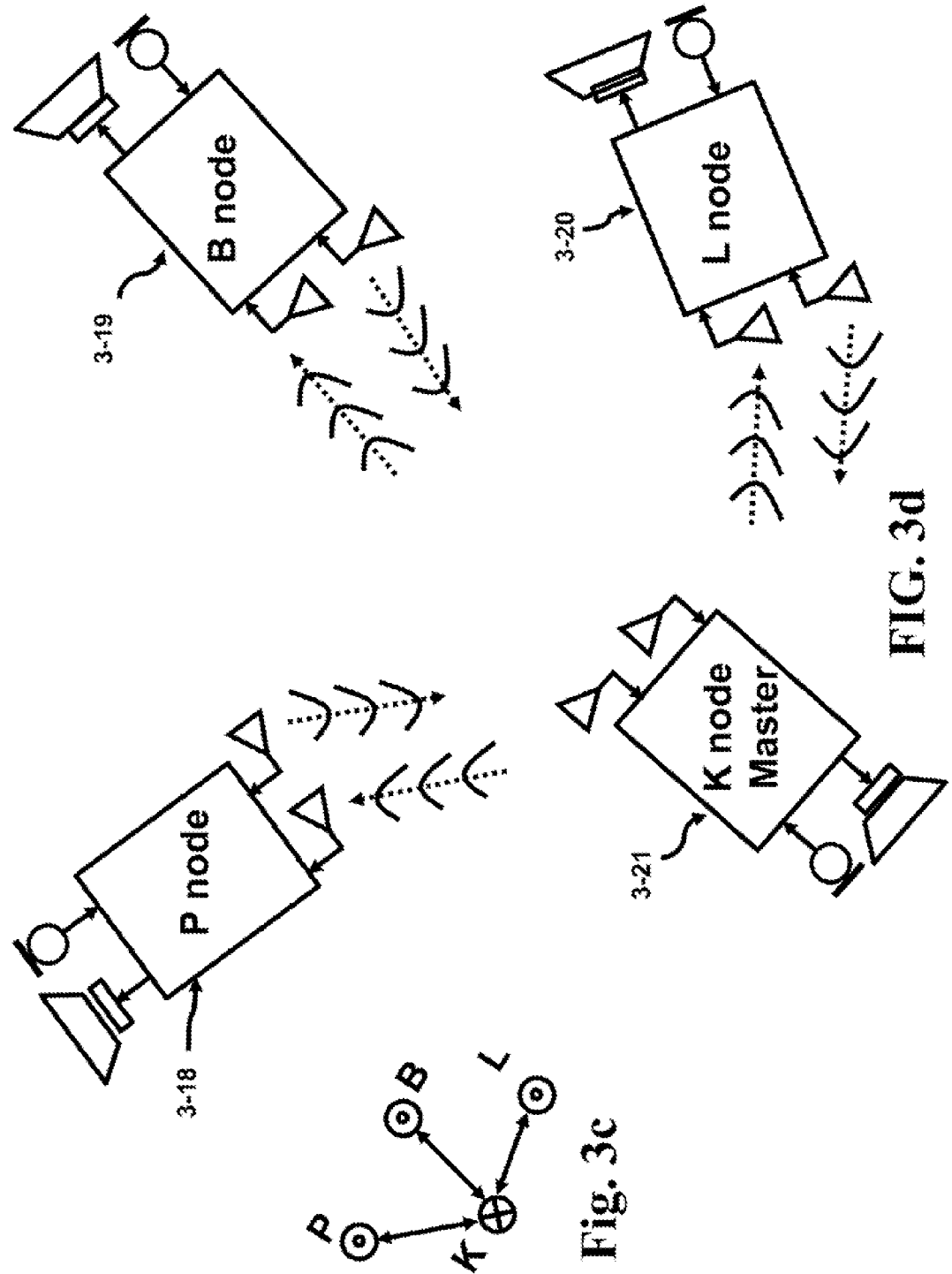
FIG. 3c presents a network configuration illustrating this inventive technique.
FIG. 3d illustrates transceivers used to form the network in FIG. 3c illustrating this inventive technique.

FIG. 3c illustrates the network in FIG. 2p while FIG. 3d replaces the K, P. B and L nodes in FIG. 3c with a block representation of the transceivers 3-21, 3-18, 3-19 and 3-20 respectively substituted the nodes by the transceiver given in FIG. 3a. The master node K 3-21 communicates with either the P, B or L nodes. And the P, B and L nodes only communicate directly with the master node K, not with each other. The communication between the nodes can use different techniques for the master node to communicate with each of the slaves: CDMA (Code Division Multiple Access), time division multiplexing, frequency division multiplexing, etc.

Although, node B communicates to node L using the indirect route through master node K. Node B communicates to node K and then node K communicates to node L. If the additional latency and any memory storage issues are not a problem, then the control of the network can be located in the master node and the basis configuration shown in FIG. 3d would give the embodiment of the idea greater flexibility. The communication between the nodes can use different techniques for the master node to communicate with each of the slaves: CDMA, time division multiplexing, frequency division multiplexing, etc.

FIG. 4a-f presents the master-slave network being used for monitoring an infant or a child in a crib or bed. Such a network can also be used with individuals in general which includes infants, babies, children, toddlers, teenagers or adults. In the first diagram 4-1 given in FIG. 4a the infant 4-4 is in a crib 4-3 at node B 2-1 (the Bedroom of FIG. 1b). Slave monitors 2-17, 2-18 and 2-13 are located in the Playroom, the Kitchen and the Living room, respectively as also shown in FIG. 1b. The master node B 2-1 transmits to all slave monitors, 2-13, 2-17 and 2-18, so when the adult 4-2 goes to the Kitchen as shown in FIG. 4b, the adult 4-2 hears silence over the bidirectional link 2-20 since the baby is sleeping. Later, the infant screams 4-6 as depicted in FIG. 4c and the adult 4-2 hears and moves to the bedroom as shown in FIG. 4d. The adult 4-2 quiets the infant or child and places the infant into a second crib 4-5 in the Living room as illustrated in FIG. 4e. The adult either issues a verbal command "Living room—master" 4-7 or a button is pushed or similar mechanical switch is enabled on the node L and the network assigns the node in the Living room as the master node. When the adult 4-2 returns to the Kitchen, the adult 4-2 hears silence over the link 2-28 from the infant in the Living room crib. Now, the adult can go into any of the three rooms K, P or B and hear if the baby is crying.

FIG. 4g-l presents another version of the master slave network being used for monitoring an infant or a child in a crib or bed. In FIG. 4g the infant 4-4 is in a crib 4-3 at node B 2-1. Slave monitors 2-17, 2-18 and 2-13 are located in the Playroom, the Kitchen and the Living room, respectively. The master node B 2-1 transmits to all slave monitors, 2-13, 2-17 and 2-18, so when the adult 4-2 goes to the Kitchen as shown in FIG. 4h, the adult 4-2 hears silence over the bidirectional link 2-20 since the baby is sleeping. Later, the infant screams 4-6 as depicted in FIG. 4i and the adult 4-2 hears and moves to the bedroom as shown in FIG. 4j. The adult 4-2 quiets the child and places the infant into a second crib 4-5 in the Living room as illustrated in FIG. 4k. The adult either issues a verbal command "Living room—monitor" 4-8 or a button is pushed or similar mechanical switch is enabled on node L and the network monitors the Living room through the master node B by the bidirectional link 2-12. When the adult 4-2 returns to the Kitchen, the master node B realizes that the adult 4-2 moved to the Kitchen K and sends the audio from node L to node K through the master node B. The adult 4-2 hears silence over the links 2-12 and 2-20 from the infant at node L in the Living room crib.

Voice recognition or sound tracking is used to reconfigure the network of nodes in the system. If the system uses voice recognition, the adult may make a statement "Send audio to this room" after they had arrived at node P or L to listen to the baby. The system recognizes the adult's voice at this new node and reroutes the baby's sounds to the node if the adult has been given the privilege at some earlier date. The privilege can be setup over the internet (internet connections not shown) or by locally setting one of the units. If the system uses sound tracking, then the system actively tracks and follows the sounds emanating from the adult allowing the system to track the adult. These sounds can include: walking, breathing, coughing, heartbeat, or any sounds made by the adult that are non-verbal. Once the adult leaves node K and moves to node P, the system automatically follows the adult as the adult moves from between these nodes (or rooms) and identifies these sounds at node P. The audio from the baby automatically routes to the new node that the adult entered. The system is sensitive to the position of an individual by monitoring the sounds emanating from the individual.

FIG. 5a illustrates the master node following the toddler or child 5-1 moving from node K to node P via the path 5-2. Although not shown, the system can be set up to function if the master node is made to follow the adult as the adult moves between the nodes. The system uses sounds generated by the toddler to determine where the child is and assigns the master network node accordingly. The sounds generated by the toddler can be: the pitter/patter of footsteps, any sounds of the voice box of the child, sounds generated by a toy being played by the child as the child moves from room to room. As the child enters node P (the playroom) the system reassigns the master node from node K to node P. The adult 4-2 hears that the child entered node P through the bidirectional link 2-24 as shown in FIG. 5b. Node P also communicates with nodes B and L via links 2-26 and 2-25, respectively. In FIG. 5b, the child who is at node P moves along path 5-3 to node B as depicted in FIG. 5c. The system identifies in which room the child is in and assigns that monitor to be the master node. The node B is now assigned the master and a link 2-20 carries the child's sounds to the adult 4-2. Finally, the child 5-1 moves along path 5-4 to node L assigning the node L to be the master node as shown in FIG. 5d. Node L is now master and the link 2-28 communicates with node K, where the adult is currently. In addition, the adult 4-2 questions the network-asking where the child 5-1 is. The system can use voice recognition to locate the child. The adult at node K communicating over the bidirectional link 2-28 to the master monitor at L asks the network to locate the child 5-1. The request is sent to the master mode L which replies to the node K and informs the adult that the child is at node L. The sounds emitted by the movement of the child or toys that they are holding are used to trace the location of the toddler or child.

When the child who was at node K (first node) and then entered node P (second node) as illustrated in FIG. 5a-b, the system reassigns the master node from node K to node P. The child at the junction of space where the distance (neglecting walls, reflections, carpets, etc.) between node K and node P is approximately equal, the system is analyzing which node is to be assigned with the child. Hysteresis prevents rapid back and forth decisions at this junction and is helpful as the region is crossed. Audio power levels can be measured by the system. Relative power measurements of the child's sounds at the transceiver or node are another way of deciding the assignment. The transceiver contains a microphone and speaker. The power measures are performed with the audio signal extracted by the microphone. As the power at second node increases while the power at the first node decreases, the direction of the child's movement is from the first node towards the second node. When the measured power at the second node exceeds the measured power at the first node by a specified pre arraigned amount, the second node is minimally displaced from the child. In addition, the second node is also considered the nearest node to the child. In some cases, the second node (the nearest node) may have a longer physical distance from the child than to the first node. Obstacles, reflections from walls and sound absorption in the path of the first node can affect the measured power comparisons.

Figure 5F:
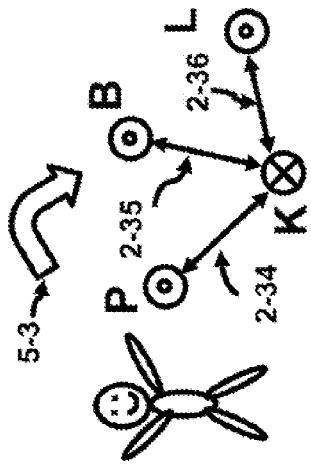
FIG. 5e-h illustrates network master node with adult allowing the adult to listen from any of the rooms illustrating this inventive technique.
Figure 5H:
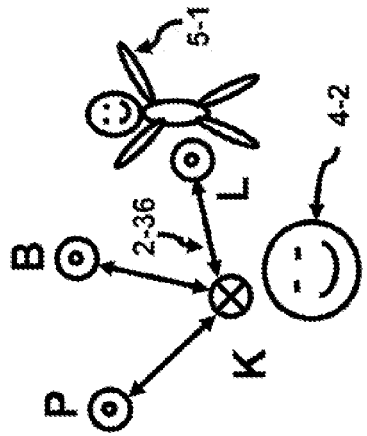
Figure 5E:
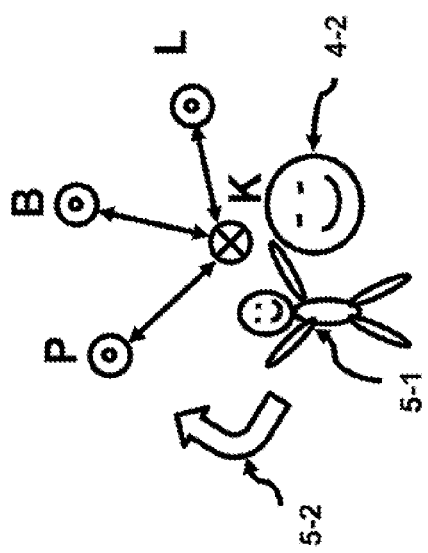
Figure 5G:
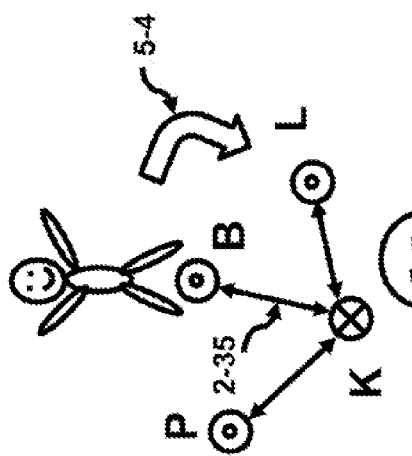

FIG. 5e illustrates the master node remaining with the adult 4-2 as the toddler 5-1 moves from node K to node P via the path 5-2. Although not shown, the system can be set up to function if the master node remains with the child as the adult moves between the nodes. The system uses sounds generated by the toddler to locate the position of the toddler. The sounds generated by the toddler can be: the pitter/patter of footsteps, any sounds of the voice box of the child, sounds generated by a toy being played by the child as the child moves from room to room. The adult 4-2 hears that the child entered node P by the bidirectional link 2-34 as shown in FIG. 5f. Node K also can communicate with nodes B and L via links 2-36 and 2-35, respectively. In FIG. 5f, the child or toddler who is at P moves along path 5-3 to node B as depicted in FIG. 5g. The system identifies the room with the child. Node K is still assigned the master and the link 2-35 communicates the child's sounds to the adult 4-2. Note the network configuration did not change. Finally, the child 5-1 moves along path 5-4 to node L as shown in FIG. 5h. The link 2-36 is the communication link between the adult and toddler. In addition, the adult 4-2 can question the network asking where the child 5-1 is. The system can use voice recognition to locate the child. The adult at master node K communicates with the master control at node K to ask the network to locate the child 5-1. The master control informs the adult that the child is at node L. The sounds emitted by the movement of the child or toys that they are holding are used to trace the location of the toddler or child.

The location of the child, once the child stops making noises or sounds, is stored into memory. If the child remains stationary, for example, by looking a picture or a page of a book, the last known location matches the position of the child. As soon as the child moves, the noise generated by the child is followed by the system. In the same room, additional background noises may exist. These background noises have already been analyzed before the child had entered the room. As the child moves around the room, the background noise is subtracted from the total noise in the room leaving the net noise corresponding to the child alone. If the child remains stationary again, the child or net noise becomes zero.

Figure 6B:
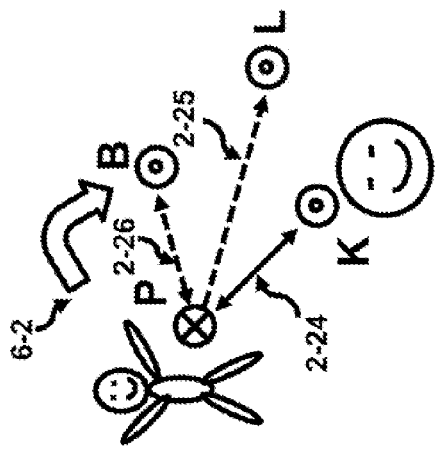
FIG. 6a-d shows the network following the child throughout the house using sound recognition and allowing only the receiver associated with the adult to listen illustrating this inventive technique.
Figure 6D:
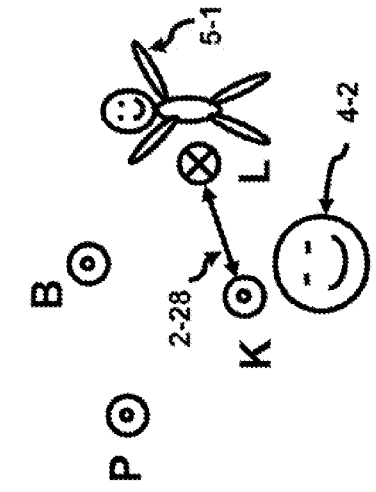
Figure 6A:
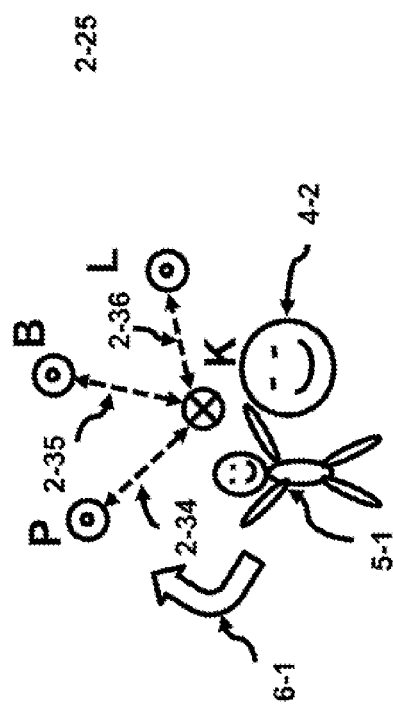
Figure 6C:
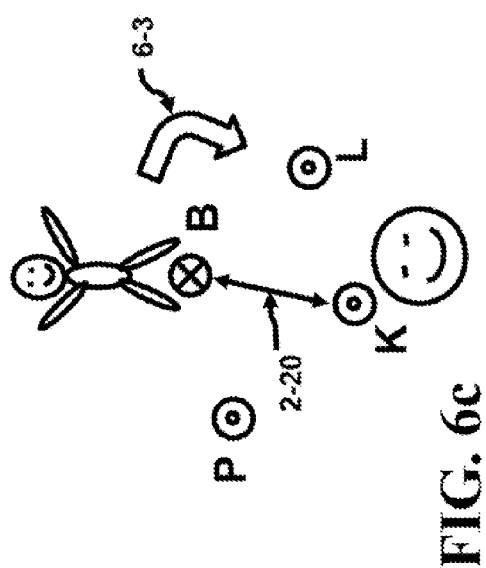

FIG. 6a illustrates the master node following the child or toddler 5-1 moving along path 6-1 from node K to node P. The system momentarily enables the links 2-34, 2-35 and 2-36 and uses sounds generated by the toddler or child to determine where the child is and adjusts the master network node accordingly. Once the child enters node P, node P is assigned to be the master node as shown in FIG. 6b. The adult 4-2 hears the system state that the child entered node P by the bidirectional link 2-24 and the voice generated at node K. All other links are disabled to save power since the network knows from sounds generated by the child where the child is located and therefore can disable the power to those rooms not containing the child. In FIG. 6b, the child moves along path 6-2 to node B and in the process node P momentarily enables links 2-26 and 2-25 to allow nodes B and L to be enabled. Once the child enters node B, the system assigns node B to be the master as depicted in FIG. 6c. The node B is now assigned master and a link 2-20 communicates the child's voice to the adult 4-2. The links from master node B to node P and L have been powered down. Finally, the child 5-1 moves along path 6-3 to node L assigning, repeating the re-enabling of the links as before, the node L as the master node as shown in FIG. 6d. Node L is now master and the link 2-28 communicate with the adult. In addition, the voice recognition can be used by the adult 4-2 to question the network, asking where child 5-1 is. The adult at node K communicating over the bidirectional link 2-28 would ask the network where the child 5-1 is and the request is sent to the master mode L. The node L replies to the node K and informs the adult that the child is located at node L.

Figure 6F:
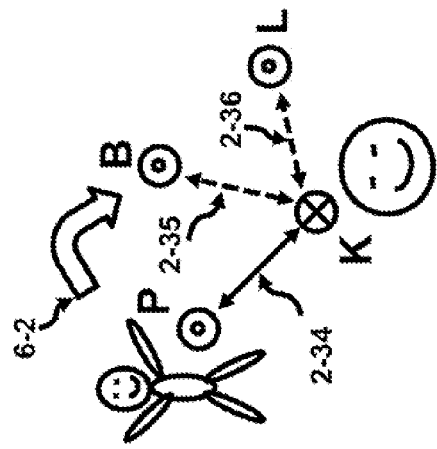
FIG. 6e-h shows the network following the child throughout the house using sound recognition and allowing only the master node associated with the adult to listen illustrating this inventive technique.
Figure 6H:
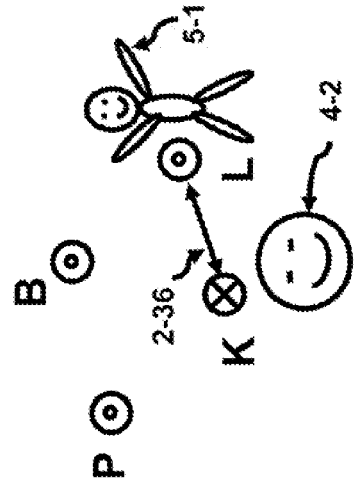
Figure 6E:
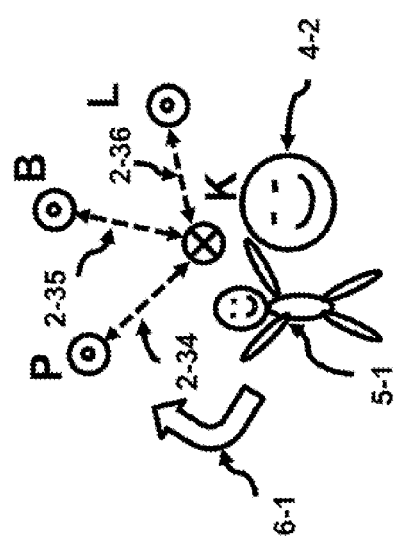
Figure 6G:
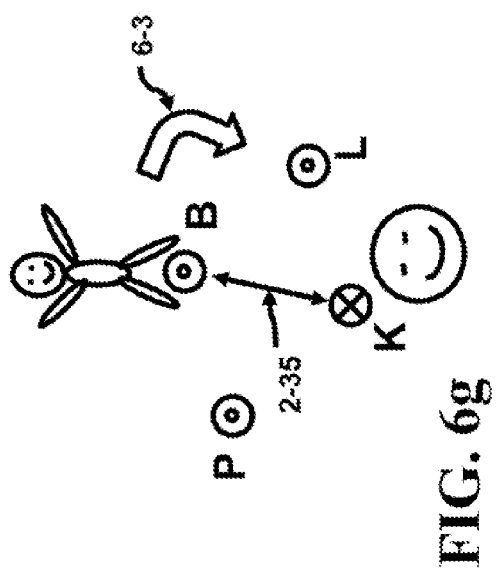

FIG. 6e illustrates the master node remaining with the adult 4-2 while the child or toddler 5-1 moves along path 6-1 from node K to node P. The system momentarily enables the links 2-34, 2-35 and 2-36 and uses sounds generated by the toddler or child to determine where the child is and adjusts the link accordingly. Node P is adjusted to be the slave node as shown in FIG. 6f. The adult 4-2 hears the system state that the child entered node P by the bidirectional link 2-34 and the voice generated at master node K. All other links are disabled to save power since the network knows from sounds generated by the child where the child is located and therefore can disable the power to those rooms not, containing the child. In FIG. 6f, the child moves along path 6-2 to node B and in the process node P, senses that the child is leaving, momentarily enables both links 2-36 and 2-35 to allow nodes B and L to be enabled to monitor and locate the child. The child enters node B and the other two links to nodes P and L are disabled as depicted in FIG. 6g. The node B is a slave and a link 2-35 communicates the toddler's voice to the adult 4-2. Finally, the child 5-1 moves along path 6-3 to node L making the node L slave as shown in FIG. 6h. In a similar fashion as before, node L is now slave and the link 2-36 provides communication between the toddler and the adult. In addition, the voice recognition can be used by the adult 4-2 to question the network, asking where child 5-1 is. The adult at master node K asks the network where the child 5-1 is and the request is provided to the adult. The master node K informs the adult that the child is located at node L.

FIG. 7a illustrates when the child 5-1 attempts to disable the network by stating "network—off" 7-1 at master node P 2-23. However, the parent did not permit the network to accept the authority of the child with this privilege and the child's request falls on deaf ears; thus, the network remains enabled as shown in FIG. 7b. On the other hand, the adult 4-2 in FIG. 7c states "network—off" 7-2 at slave node 2-18. The slave node K sends the message to master node P 2-23 over the link 2-24 and the master node disables the link as illustrated in FIG. 7d. This allows privacy to exist in the area where the monitors are located. Only those individuals who have been assigned with the privilege can place the network into a sleep mode or make any major modification mode to the function of the network either through voice control or keyboard control.

Similarly, in FIG. 8a, when the child 5-1 attempts to enable the network by stating "network—on" 8-1 at node 2-17, the network does not enable as illustrated in FIG. 8b. In FIG. 8c, the adult 4-2 states "network—on" 8-2 at node 2-13. As shown in FIG. 8d, the network is enabled with the master node being L 2-30, the child 5-1 at slave node P 2-17 is coupled to the master node L by the link 2-29. Similarly, if the adult had been at a different slave node, like node B, the adult 4-2 states "network—on" 8-3 the network is enabled as in FIG. 8f, the child 5-1 at slave node P 2-17 is coupled to the master node B 2-1 by the link 2-19.

FIG. 9 illustrates a network that tracks two children 5-1 and 9-2. In FIG. 9a, the adult 4-2 states "network—on" 9-1 at node K 2-18. FIG. 9b shows the network enabled where the master node K 2-37 communicates to the slave nodes P 2-17, B 2-22 and L 2-13 using the bidirectional links 2-34, 2-35 and 2-36. The network determines the location of the two children 5-1 at node P 2-17 and the child 9-2 at node 2-22 by using either voice recognition or sounds of the children. Then, the network reconfigures the links to spend more time at the two nodes where the children are and little or no time at node L since there is no activity at that node. The network time shares the link 2-34 in FIG. 9c to listen to child 5-1 saying "Hello" 9-3 and then switches to link 2-35 as shown in FIG. 9d where the child 9-2 at node B 2-22 says "Hi" 9-4. If the children remain silent, then the monitoring of this network is illustrated in FIG. 9e where the master node K 2-37 alternates attention between the Playroom Node P 2-17 and the Bedroom node B 2-22 equally.

FIG. 10 illustrates another intelligent network that uses voice recognition or sounds of the individuals (babies, toddlers, children, person, and adults) to adjust the time spent on each node. FIG. 10a shows the adult 4-2 at master node K 2-37 that is in communications with the nodes P, B and L using the links 2-34, 2-35 and 2-36, respectively. A child 5-1 is at node P while two children 10-1 and 10-2 are at node L. Nodes P and L are occupied since at least one child is assigned to them; however, node B is unoccupied since no child is currently assigned to this node. Since the L node has two children, the voice recognition or sound identifier assigns more time to this node as illustrates in the first half of the graph 10-4. Note some time is spent at the Playroom P node from $t_0$ to $t_1$ since there is one child 5-1 there. At node B or the Bedroom, no one is there, so the time spent is the least amount from $t_1$ to $t_2$. In some cases, no time at all will be spent at this node. However, in the Living room or node L, the time spent is the largest from time $t_2$ to $t_3$. The moving child 10-2 is assigned a different minimally displaced node at time $t_3$, terminating the previous time interval between $t_0$ to $t_3$. At this point, the child is minimally displaced to the B node when compared to the L node and the demarcation between these two nodes is represented by the time $t_3$. The child 10-2 now occupies the node B which was previously unoccupied. This demarcation terminates the previous time period $t_0$ to $t_3$ and starts the current time period $t_3$ to $t_6$.

FIG. 10a shows that child 10-2 moves along path 10-3 to node B as illustrated in FIG. 10b. With a child in each of the three nodes: P, B and L, the graph 10-4 after time $t_3$ depicts that the time spent on each node becomes more equal if all children talk. Another possibility of monitoring the nodes in FIG. 10a or FIG. 10b is to calculate a percentage of the time spend at each slave node based on the number of child occupying that node to the total number of children being occupied at the rest of the nodes. Each occupied node is monitored over the first time period proportional to the number of individuals at that node divided by number of all of the individuals at the slave nodes. For instance in FIG. 10a, the percentage of time spent at each of the following nodes would be P 1/3, B 0, and L 2/3 and in FIG. 10b, the percentage of time spent at each of the following nodes would be P 1/3, B 1/3, and L 1/3.

As each child adjusts their talking rate, the system adjusts the amount of time spent at each node and in some cases spends little or no time at a quite node. Another way of distributing the time spent on each node is to determine how much activity is occurring in each room. A child in one room may be reading and will stay quiet; thus, would not be heard over the network. In this case, less time will be spent monitoring this room. FIG. 11a depicts children 5-1 and 10-1 speaking 11-1 at node P and 11-2 at node L, respectively. Viewing the first half of the graph 11-5 in FIG. 11c, little time is spent on the bedroom or node B ($t_1$ to $t_2$) even though a child 10-2 is there, but an equal time is spent on the Playroom node P ($t_0$ to $t_1$) and the Living room node L ($t_2$ to $t_3$) where both children are talking. In FIG. 11b, only the child 10-2 is speaking 11-3, so less time is spent on the Playroom node P ($t_3$ to $t_4$) and the Living room node L($t_5$ to $t_6$), while more time ($t_4$ to $t_5$) is spent on Bedroom node B. The control can be dictated by the adult through voice recognition. In FIG. 11b, the adult states "Playroom" 11-4 at time equals $t_6$ and then only the playroom or node P is listened to after $t_6$.

Figure 12:
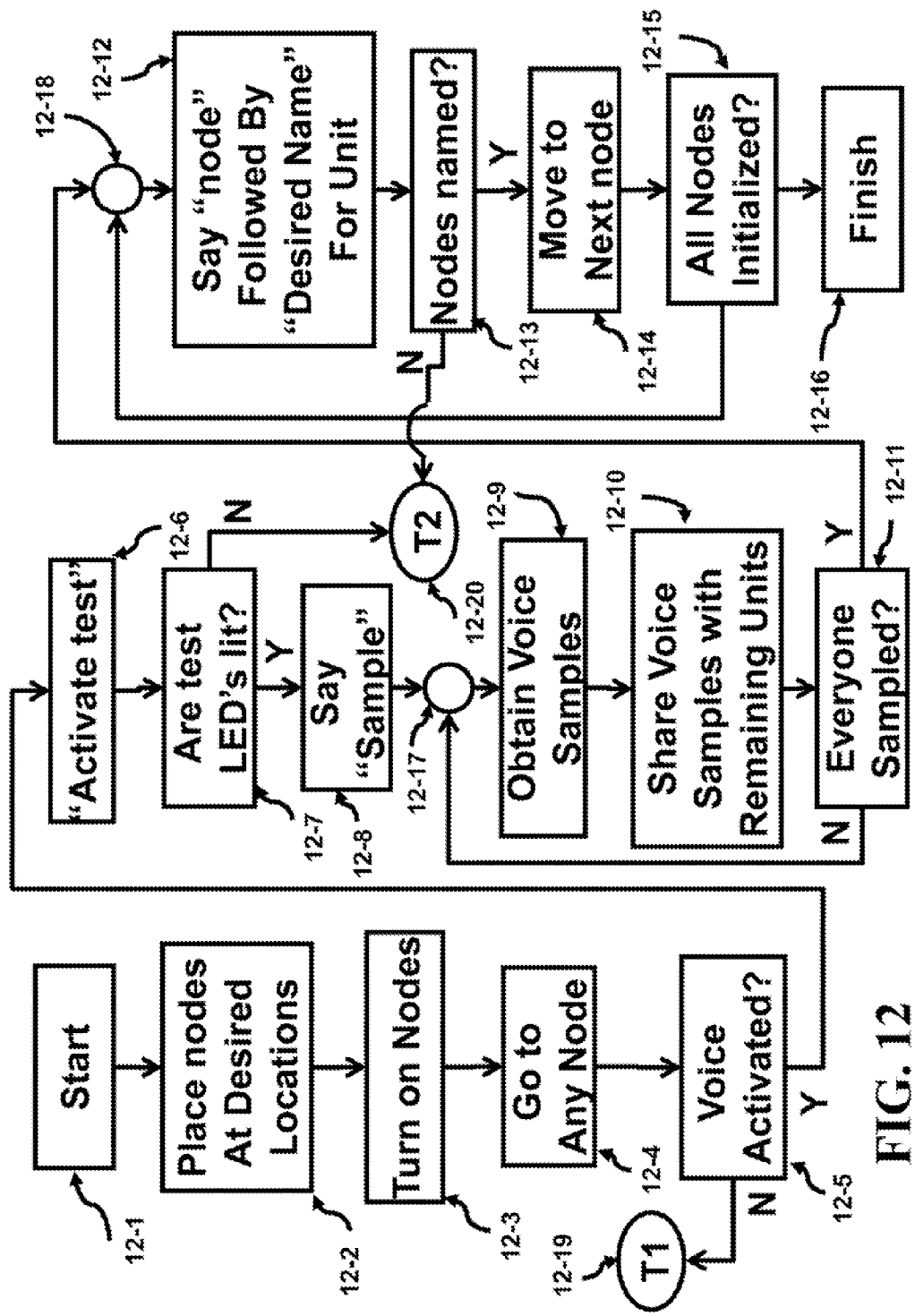
FIG. 12 depicts a flowchart of initializing unit illustrating this inventive technique.

A flowchart to setup the network is depicted in FIG. 12. From start 12-1, all nodes or units comprising the physical system are placed at the desired locations 12-2. The nodes are then turned on 12-3. Proceed to any node 12-4 and if voice or sound activated 12-6, activate test 12-6 stating "activate test". When the LED's on the unit are lit 12-7, say "sample voice" 12-8. The node will provide verbal instructions for the user to follow 12-9. These phases are repeated until the voice recognition unit comprehends the message. The network then shares the voice recognition abilities with the remaining nodes 12-10. Once everyone is sampled 12-11, name the nodes 12-12 with a desired name like "Bedroom", "Kitchen", etc. Once the all nodes are named 12-13, move to the next node 12-14 if they are. If all nodes are initialed 12-15 then you are finished 12-16.

On the other hand if the network is not voice activated 12-5 go to T1 12-19 and manually "push button" 13-1 as illustrated in FIG. 13*a*. The test is activated 13-2. Perform diagnostics 13-13 if none of the LED's are lit 13-3 otherwise, proceed to saying the name of the nodes 13-6 and recoding the name into memory 13-7. If the names are stored 13-8, push the button 13-9 and move to the next node 13-10. When all nodes are initialed 13-11, go to finish 13-12.

The nodes can have the appearance on the unit 13-14 of the node as illustrated in FIG. 13*b*. Once the network is setup, the LED's in 13-16 and 13-17 indicate which node is assigned the master and what nodes are assigned the slaves. In addition, a display screen 13-15 provides information to the user. The unit 13-14 can also contain voice and sound recognition capabilities.

Figure 14A:
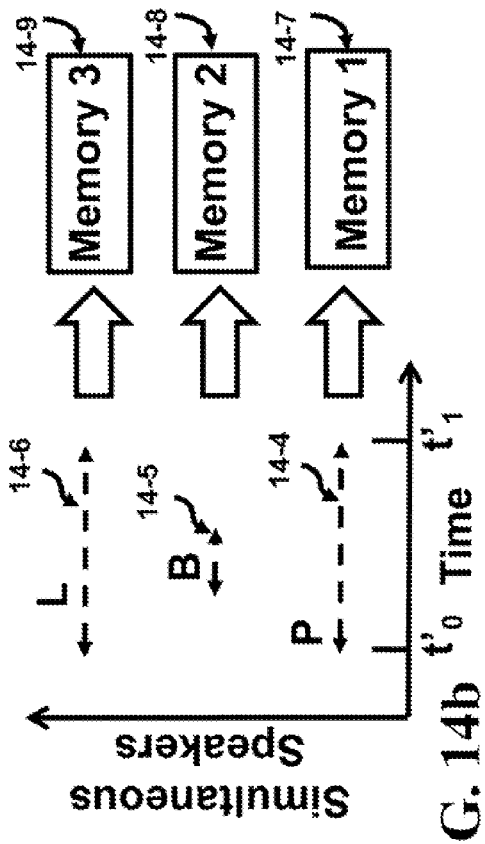
FIG. 14a shows the network time sharing between all the rooms illustrating this inventive technique.
Figure 14B:
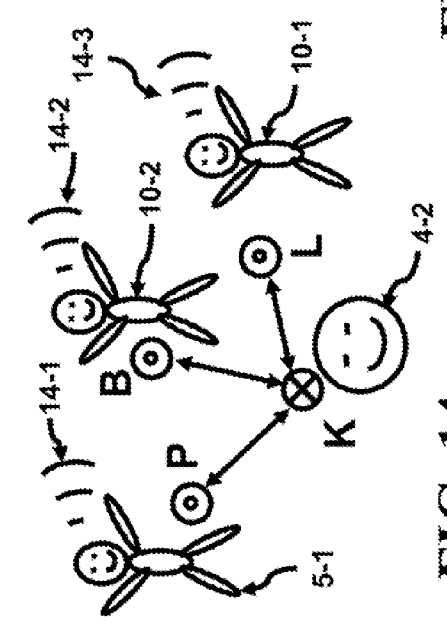
FIG. 14b depicts the situation where several rooms generate voices simultaneously that is stored into memory illustrating this inventive technique.
Figure 14D:
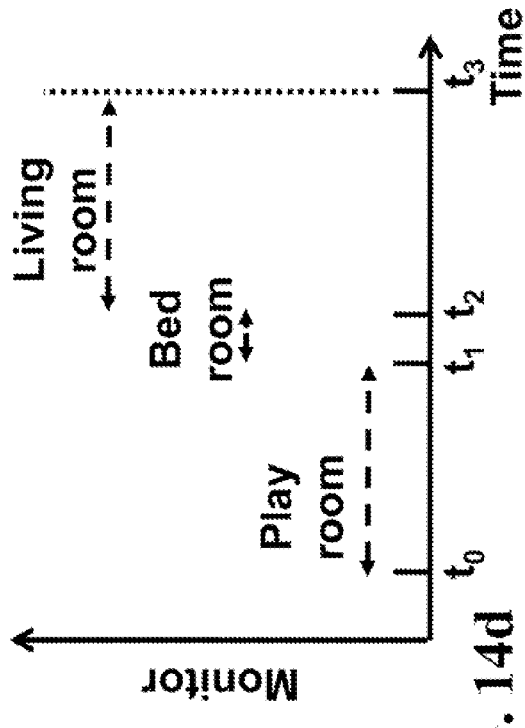
FIG. 14d shows the playback to the adult in accordance with the present invention.
Figure 14C:
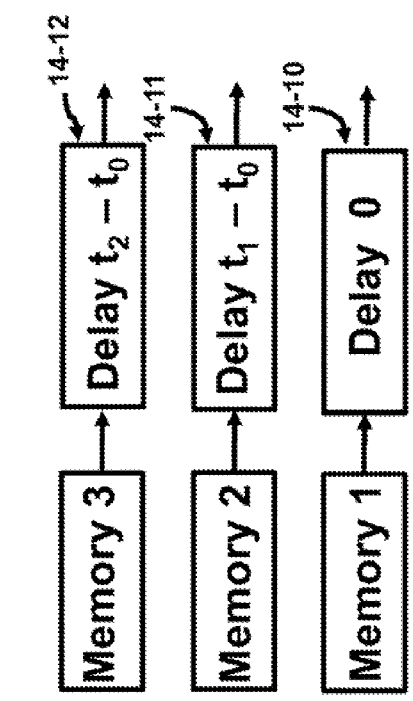
FIG. 14c illustrates the delaying the memory to rearrange the voices sequentially in accordance with the present invention.

FIG. 14*a* depicts a situation where node K is assigned the master node with an adult 4-2 and the slave nodes P, B and L each have a child 5-1, 10-2 and 10-1, respectively. All children are making sounds or talking at the same time 14-1, 14-2 and 14-3. The network is intelligent and determines that multiple persons are speaking simultaneously so the network stores these voices into memory as shown in FIG. 14*b*. Between $t_0'$ and $t_1'$, the three different children speak 14-6, 14-5 and 14-4. The voice or sound 14-4 at node P of child 5-1 is stored into memory 1 14-7, the voice or sound 14-5 at node B of child 10-2 is stored into memory 2 14-8 and the voice or sound 14-6 at node L of child 10-1 is stored into memory 3 14-9. This memory can be local to the node or it can be stored in one of the other nodes. The network can also be coupled to an external network by a phone line or internet connection (not shown). The memory would be stored in a server on the internet. Then, when the adult 4-2 desires to hear the voices or sounds, the three voices or sounds are played back with delays 14-10, 14-11 and 14-12 as shown in FIG. 14*c*. FIG. 14*d* shows the non-overlap of the sounds when the memory is played back or monitor. The delays are non-overlapping. The graph in FIG. 14*d* then insures that the voices or sounds do not overlap thereby allowing the adult to hear the entire voice or sound of each node.

Figure 15:
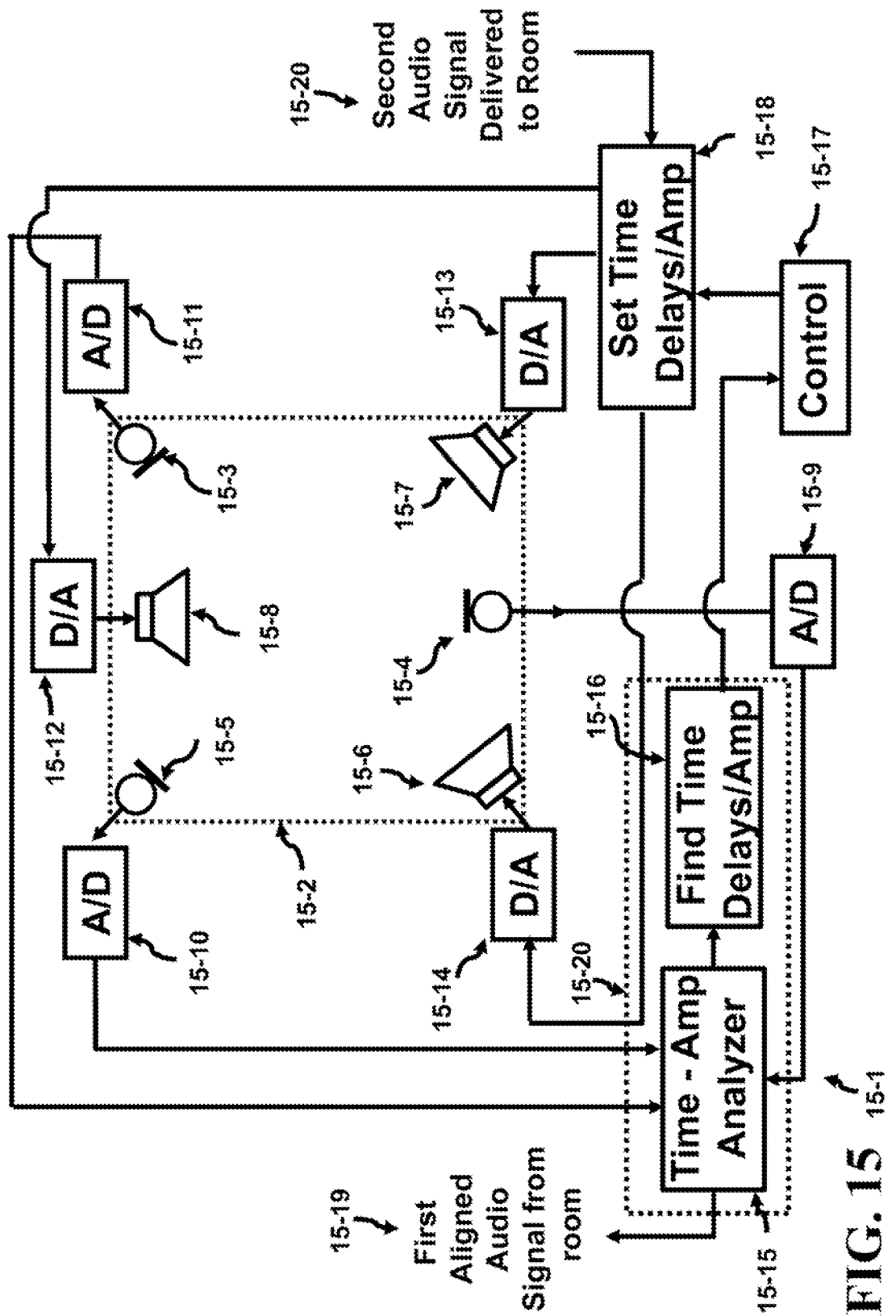
FIG. 15 depicts a system to locate an individual in a room or location in accordance with the present invention.

FIG. 15 presents a system 15-1 of microphones 15-3, 15-4 and 15-5 and speakers 15-6, 15-7 and 15-8 in a room. Assume for now that in this room there exists a stationary audio source. The microphones detects the stationary audio source and couples the audio signal to the A/D (analog to digital) converters 15-9, 15-10 and 15-11. The audio signal represents the actual audio sounds in space. The audio signal is transformed between analog voltages by the use of transducers: speakers and microphones where the analog voltages carry the audio signal. The analog voltages also are transformed between digital signals by the use of A/D's and D/A's. The audio signal is now represented by digital bits (packaged as bits, bytes, half words, words) that contain the information of the audio signal. These digital bits can be made to stream to their destination along a connecting path and is called the digital bit stream. The audio signal can be transformed, carried and manipulated in different mediums or environments. The digital bit stream from the three A/D's are coupled to the Time-Amp Analyzer 15-15. Although three microphone and three speakers are illustrated, the number of microphones or speakers is dependent on the desired accuracy of the system. The Time-Amp Analyzer uses correlation between the several different digital bit streams of the audio signal arriving from the A/D's associated with the microphones. The digital bit stream applied to the Time-Amp Analyzer comprises a digital signal converted by the A/D's after being transformed into an analog audio signal that is extracted from the stationary audio source in the room. The correlators in the Time-Amp Analyzer 15-15 determine the time shift or time delay between the three audio signals being analyzed. As practiced in the art, correlators are used to find similarity between two waveforms as one waveform is shifted against the other. A peak occurs when the waveforms make a best match. The time difference shift between the two waveforms generating the peak provides the time shift. These time delays are used to alignment of the various data bit streams arriving from the A/D's. The average power of the received analog signals at the microphones is also measured. Once measured, the average relative power of the analog signals as emitted by the individual but captured by the microphone can be determined, to a first order, by extrapolating the measured result of the power at the microphone back to the individual. The extrapolation uses the fact that power of the sound wave is inversely proportional to the square of the distance. Since the distance between the individual and each microphone has already been determined, the ratio of the distances between two results can be used to extrapolate the relative power of the sounds developed by the individual.

The time alignment information extracted by the correlators between the received digital bit streams is also sent to the receiver path and applied to the Set Time Delays/Amp 15-18 in FIG. 15. This information allows the digital bit stream of the second audio signal (the audio from a TV show, for example) being delivered to the room to be tapped at different locations and applied to the speakers so that the sound arrives at the individual in the room in unison. Each tapped digital bit stream from the tap point is applied to their respective D/A 15-12, 15-13 and 15-14 and corresponding speaker 15-8, 15-7 and 15-6. The tap points of the digital bit stream compensates for the delay of the audio in space between the individual and the speakers.

These time delays are determined in 15-16 and the time delays are used to alignment the audio signals from the various digital bit stream being applied to the microphones into one unified audio signal of the stationary audio source. This allows the system to amplify quite sounds in the room. For instance, the individual is sitting in the room and states "channel 55", the system identifies the location of the individual and determines the time shifts of the several audio signals. The system changes the TV channel to 55, and adjusts the summation of the received signals to reinforce one another to generate the first aligned audio signal 15-19 from the room. The first aligned audio signal allows even quieter sounds from the individual to be heard. The biometric sounds such as breathing, coughing, moving become more pronounced.

The Time-Amp Analyzer 15-15 and Find Time Delays/Amp 15-16 are part of the processor 15-20. The processor can be a microprocessor or a DSP (Digital Signal Processor) where additional signal processing is done if required as known in the art.

The time delays can also be translated into distances since the velocity in dry air at 20 C is about 340 meters per second.

The locations of the microphones are in a known 3-D Cartesian coordinate system and are positioned at different heights near the periphery of the room or enclosement. The microphones are within the audio transceivers. An audio transceiver includes a microphone and speaker at one location. Triangulations of these distances from the microphone intersect at a point and determine the location or position of the stationary audio source in the room. The audio sources can be detected either by a sound recognition system, a voice recognition system, or both. The database in each of the recognition systems can identify voices, detect content of speech if desired, stepping sounds, biometric data such as choughs, heartbeat, and or breathing. Some of the systems can be very sensitive allowing the full range of detection, while others are less sensitive (not being able to detect a heartbeat) but less costly.

Once the distances from the microphones to the stationary audio source in the room are known, the distances from the speakers to the stationary audio source in the room is also known since one microphone and one speaker are co-located in the audio transceiver. The microphones and speakers are typically attached to the surfaces of the walls of the room and are considered stationary. Thus, the microphones and speakers have a specific positional relationship to each other and to the room or enclosement. This specific positional relationship between the microphones, speakers and the room or enclosement can be used to determine positions and locations within the room. A room or enclosement is a distinguishable space within a structure. One structure has walls, a floor, a ceiling and an entrance. The time delays as determined in 15-16 can be applied and used in the speaker system to reinforce the sound delivered to the individual. Thus, as a second audio signal is delivered to the room 15-20 in FIG. 15, the control 15-17 or control unit determines the position of the tap points of a delay line such as a FIFO (First In First Out). The tap points set the Time Delays of the FIFO in the block 15-18 and are coupled to D/A (digital to analog) converters 15-12, 15-13 and 15-14 to generate audio signals. These tap points remove the electrical delay of passing through the remainder of the FIFO, however, the delay is added back into this path since the audio signal requires a time delay (distance) to propagate through free space which is equivalent to the time delay that would have been spent in the FIFO till the end of the delay line. The largest distance determined requires that the audio signal is tapped at an earlier point in the second audio signal stream of the FIFO. The next largest distance requires that the audio signal within the FIFO is tapped at a later point in the signal stream. Finally, the last tap point (output of the FIFO) corresponding to the shortest distance comes out the end of the delay line or FIFO. This way, the delays determined by the correlators in the Time-Amp 15-15 are utilized in determining the tap points in the delay line of the FIFO to insure that the audio signal arrives with maximum intensity at the location of the audio source in the room. A human at the stationary audio source would hear a reinforced or stronger sound.

FIG. 16a illustrates a transceiver which has an audio input and output side on one end of the transceiver 16-2 and 16-1 and an electrical input and output side on the other end 16-3 and 16-4. The bidirectional audio signal is shown as 16-1 and 16-2. In addition, a bi-directional electrical signal, corresponding to the audio signal, is shown as 16-3 and 16-4 on the electrical end of the transceiver. This electrical signal can be further processed to couple to a wireless interface. The transceiver's incoming digital bit stream 16-3 is used to drive the speaker to generate the outgoing audio signal 16-1. An incoming audio signal from the room 16-2 is detected and transformed into an electronic signal which is generated as a digital bit stream at 16-4. The microphone receives the input audio signal 16-2, sends the signal to the A/D to generate the outgoing signal 16-4. The incoming signal 16-3 is applied to the D/A and then to the speaker to generate the incoming audio signal 16-1. A symbol 16-6 provided in FIG. 16b as 16-5 and combines the speaker, microphone, D/A and A/D into the symbol 16-6. The incoming and outgoing audio signals are applied to the solid box 16-7 incorporating the speaker and microphone.

The symbol 16-6 is used in FIG. 16c in three places A, B and C near the boundaries of the room 16-8. An individual 16-9 emits sounds 16-10 and is moving. The individual traces out a path 16-11 in the room 16-8. Two points 16-12 and 16-13 along this path 16-11 are identified. When the individual is at point 16-12, the time delay to the microphones of any noise or sounds the individual 16-9 emitted passes through free space to the three microphones in transceivers A, B and C to generate the three outgoing electrical signals. The correlators measure the time differences of the three received audio sounds. The time $t_1$ in FIG. 16c between A and 16-12 is the shortest, while the time $t_2$ between B and 16-12 is the next shortest and the final time $t_3$ between C and 16-12 is the longest. Similarly when the individual 16-9 is at location 16-13, the time $t_6$ between C and 16-13 is the shortest, while the time $t_4$ between A and 16-13 is the next shortest and the final time $t_5$ between B and 16-13 is the longest. The time delays vary depending on the location of the individual. By recording these time delays, the individual can be tracked or monitored over time.

A tuning diagram is shown in FIG. 17a for the situation where the individual 16-9 in FIG. 16e is at position 16-12. This timing diagram represents the waveforms of sound L, M, and N as they arrive at microphones of the audio transceivers A, B and C, respectively. The sound is generated by the individual 16-9 as the sound could include breathing, heartbeat, voice of the individual or any other noise that that particular individual may be making while being in the room. A noise floor for the waveforms L 17-1, M 17-2 and N 17-3 has been set as the reference point. Any noise below the noise floor will not be registered. The signal above the noise floor illustrates a triangular waveform, although any waveform can be used. Audio has frequencies that range from 20 Hz to 20,000 Hz while the audio carried over a telephone system ranges from 300 Hz to 3400 Hz has a reduced bandwidth fro comparison. To simply the detection of the audio signal at the microphone, the bandwidth of the sound can be filtered after the microphone to a narrow band between 1000 Hz to 3000 Hz. The wavelength of the sound is related to velocity by: wavelength=(velocity)/(frequency). The wavelength of the sound for the narrow band ranges between 1000 Hz to 3000 Hz varies from 0.342 m to 0.116 m, well within the dimensions of a typical room. However, the system can be designed to encompass a wider bandwidth at but the expense of circuit complexity and cost would increase. In addition, the system can be further increased in complexity to account for reflections from surfaces.

All waveforms in FIG. 17a are delayed from the origin by the time interval Δ. The first waveform for L arrives at a delay time of $t_1$ which is equal to the time interval of Δ while the waveform for M arrives at a delay of $t_2$ after a time offset of $-\Delta t_{1-2}$ later and finally the waveform for N arrives at a delay of $t_3$ after a time offset $+\Delta t_{3-1}$ later. Finally, $t_2-t_3=-\Delta t_{2-3}$. These time offsets can be easily translated into distances to help triangulate the location of the source of the sound. These times are proportional to the distances by the equation: distance=(time)*(velocity of sound) which is used to determine the distances between the microphones and the individual. The position of the individual 16-9 with respect to the room is determined by the triangulation of these distances from the microphones. Once the distance of the individual from the microphones is known, the distances between the speakers and the individual are also known. These three different time offsets can be translated into distances based on the speed of sound in the room at a given temperature. These three distances can be used to triangulate the location of the source of the sound based on the distances relative to the audio transceivers at positions A, B and C that have detected the sound.

In FIG. 17*b*, a system 17-4 uses the several measured responses of sound at the microphones (L, M and N) that arrived from a single source, the individual, within the room and the system performs three correlations 17-7, 17-6 and 17-5 to determine the values of the time offsets, $\Delta t_{2-3}$ $\Delta t_{1-2}$, and $\Delta t_{3-1}$ illustrated in FIG. 17*a*. Correlator 1 17-5 correlates between waveform L and waveform N, correlator 2 17-6 correlates between waveform M and waveform L, and correlator 3 17-7 correlates between waveform N and, waveform M. These time offsets are used by Max/MIN block 17-8 to find the maximum and minimum while the Mid Time block 17-9 determines the in-between time offset. After the correlators perform the measurements between these three waveforms, the latest waveform has the largest time offset 17-11 and is called the MAX time period. The earliest waveform has the shortest time offset 17-10 and is called the MIN time period. In addition, the time offset 17-12 of the middle or third waveform is called the MID time period and is determined from the data extracted from the three correlators within block Mid Time 17-9. The correlators, MAX/MIN and MID TIME blocks are part of a processor (not shown) that can be a microprocessor or a DSP.

These time offset periods are presented to the tap point section 17-19 of the FIFO memory 17-20 carrying the second audio data stream 15-20 delivered to the room. The FIFO operates at a given frequency rate or (bytes, words)/sec. Knowing the delay time, the FIFO rate is multiplied by this delay time to determine how many bytes or words earlier the FIFO must be tapped to extract the appropriate digital bit stream having the appropriate time offset equal to the delay time.

FIG. 17*b* be also illustrates the FIFO memory 17-20. This FIFO memory receives a second audio data stream 15-20 delivered to the room that is eventually used to drive the speakers. The dashed arrow indicates the data flow along the FIFO 17-20 and is illustrated in the downward direction. Alongside of the FIFO 17-20 is the tap block 17-19 that receives time information from the blocks 17-9 and 17-8 and works in conjunction with the FIFO 17-20 to control the locations of the tap points of the FIFO 17-20. The blocks 17-9 and 17-8 provides the appropriate information to the tap block 17-19 so that the appropriate tap points are set in the FIFO 17-20. For example, the maximum point, 17-11 is applied to the tap control TAP+X 17-17 to control the tapping of the memory stream at MEM+X 17-18. This tapped stream is applied to AMP C 17-23 and then the speaker C where the path between the individual and speaker is the longest. The minimum point 17-10 is applied to the tap control NOW 17-13 to control the tapping of the memory stream at MEM+0 17-14. This tapped stream is applied to AMP A 17-21 and then to speaker A since the path between the individual and speaker A is the shortest. The middle point 17-12 is applied to the tap control TAP+V 17-15 to control the tapping of the memory stream at MEM+V 17-16. This tapped stream is applied to AMP B 17-22 and then to speaker B since the path between the individual and speaker B is in between the longest and shortest distances. Cnt Vol block 17-25 determines the volume necessary to get the power of the audio delivered to the individual correctly and sets the amplifiers: AMP A, AMP B and AMP C controlled by the Adjust Amp block 17-24. The sound generated by speakers in the transceivers A, B and C arrive at the location of the individual aligned in time and corrected for power variations thereby increasing the amplitude of the sound to the individual.

The setting or adjustment of the power of the three AMP's is dependent on the earlier measurement of the power in the audio signals received at the microphones of the individual. The received power at the microphone is extrapolated to the individual by using the knowledge that the power of the sound is reduced by the square of the distance. The distance has already been determined so the measured power of the received signal from the individual can be extrapolated. This information is used to set the power output of the three AMP's 17-21, 17-22 and 17-23.

Figure 17C:
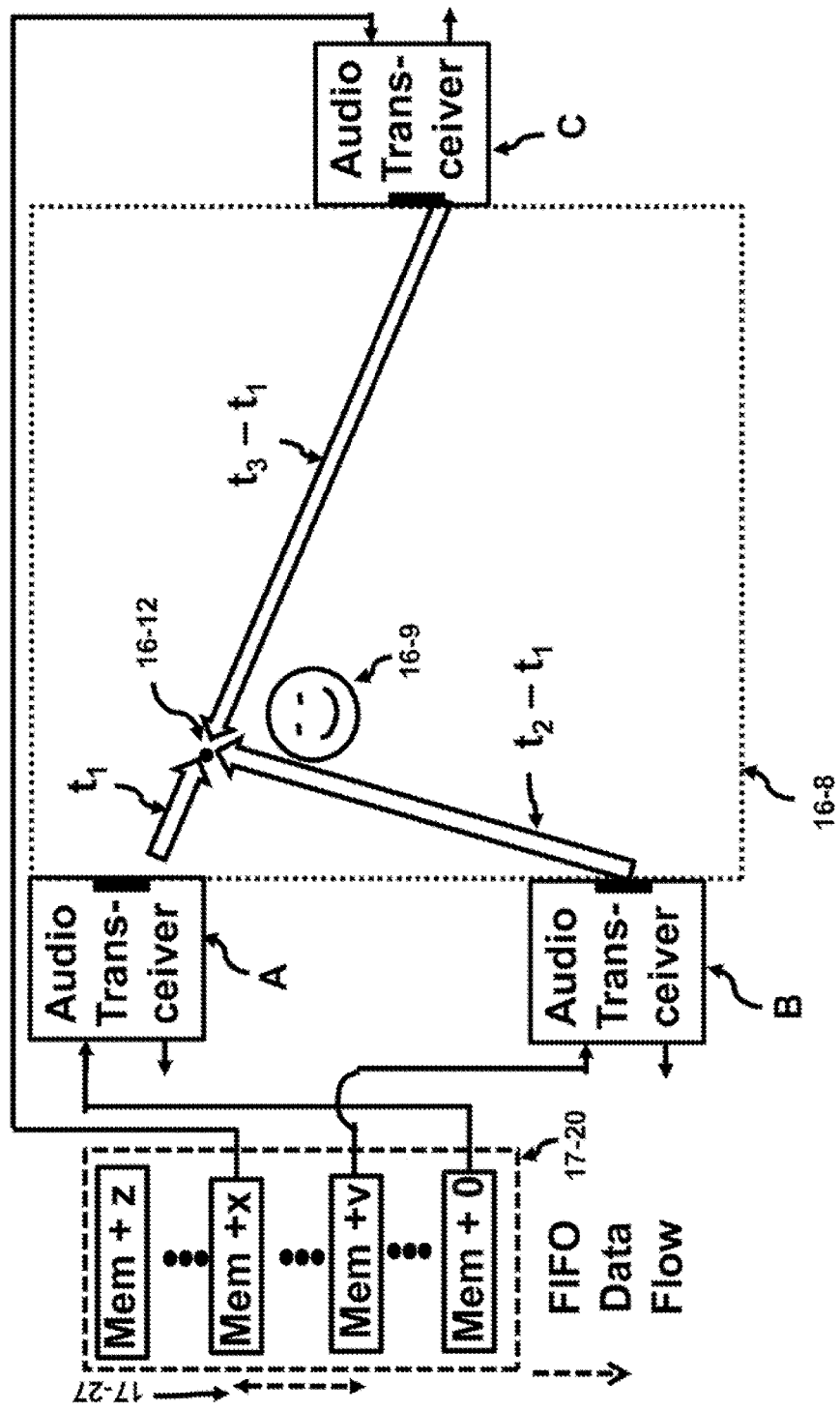
FIG. 17c illustrates the audio delivery to the individual illustrating this inventive technique.

FIG. 17*c* illustrates the case 17-26 of the individual 16-9 in the room 16-8, while being positioned at location 16-12, receiving the contents of the second audio data stream from the FIFO 17-20. The final output of the FIFO at MEM+0 is applied to the audio transceiver at A and after a period of time $t_1$ the sound of the minimum (final) output arrives at location 16-12. The middle tab point from the FIFO MEM+V position is applied to the audio transceiver at B and after a period of time $t_2$-$t_1$ the sound of the final output arrives at location 16-12. And finally, the maximum tab point from the FIFO MEM+V position is applied to the audio transceiver at C and after a period of time $t_3$-$t_1$ the sound of the maximum output arrives at location 16-12. The individual 16-9 located at position 16-12 receives three aligned sound waveforms that reinforce one another. The displacement 17-27 between the data in MEM+V and MEM+X in the FIFO 17-20 translates to a time delay or time offset. The time offset is $(t_3-t_1)-(t_2-t_1)=t_3-t_2=-\Delta t_{2-3}$ and agrees with the timing diagram in FIG. 17*a*.

Once the location of the source of the sound received by the microphones in the room has been determined, the audio transceivers at positions at A, B and C use this information to deliver a reinforced audio sound from speakers to the location of the source of the sound. For example, a first person watching TV located at the source of the sound received by the microphones may be hard of hearing and because the sound wave being delivered by the speakers of the TV show had not been aligned, the first person needs to increase the volume of this audio signal. A second person in the domicile who is not watching TV is uncomfortable with the volume being set so loud since the baby may wake up. If the outputs of the speakers in the audio transceivers are aligned at the first person; the reinforced audio sound has effectively been amplified at the point where the first person is located. Such a system could be used to align the audio when a first person is viewing a TV show. The alignment of the sound from the three audio transducers at the location of the first person using this invention allows the average volume of the TV show to be set lower thereby helping to satisfy the criteria of the second person.

The alignment of the sound occurs because these time delays or time offsets that were measured using the correlators are now mapped to the register locations within a FIFO that carries a serial stream of audio data representing the audio signal of, for instance, a TV show. When these register locations are enabled, the data stream of the FIFO is tapped at two earlier points in the data flow stream of the audio signal of the TV signal and are sent to the room via two of the three audio transducers located at either A, B or C such the FIFO provides the audio signal an earlier time when compared to the final audio transducer which uses the final output of the FIFO. The earliest tapped audio signals, however, has to travel a longer distance when compared to the last output of the FIFO. The propagation time of the earliest tapped audio signal compensates and equalizes the difference between two delays. These time delays in FIG. 17b, determined by the correlators, align and reinforce these waveforms within the system (not shown) and perform at effective amplification of the signal. Furthermore, although a FIFO is shown to easily illustrate this concept, any memory system with the appropriate addressing scheme could be used such as a FIFO, RAM (Random Access Memory), ROM (Read Only Memory), or a DRAM (Dynamic Random Access Memory).

Figure 18A:
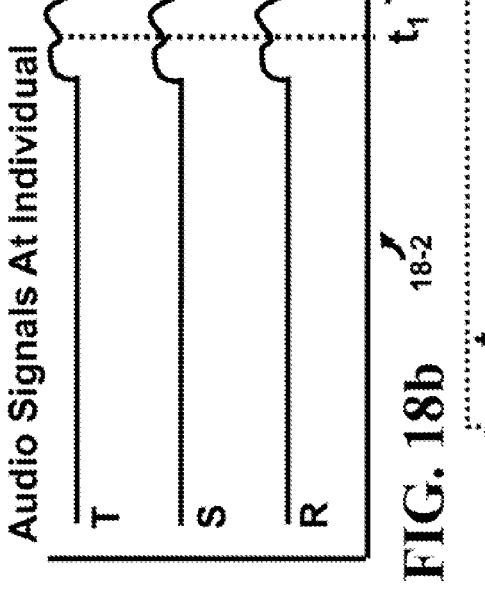
FIG. 18a shows the audio time diagrams at the speaker illustrating this inventive technique.
Figure 18B:
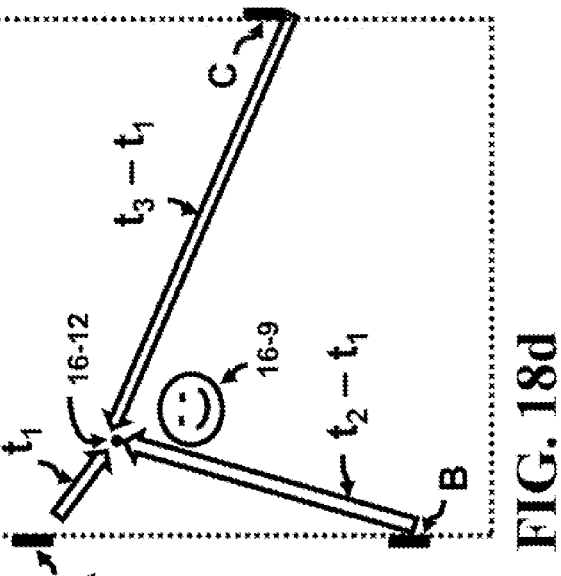
FIG. 18b shows the audio time diagrams after arriving at the individual from the different speakers in FIG. 18a illustrating this inventive technique.
Figure 18C:
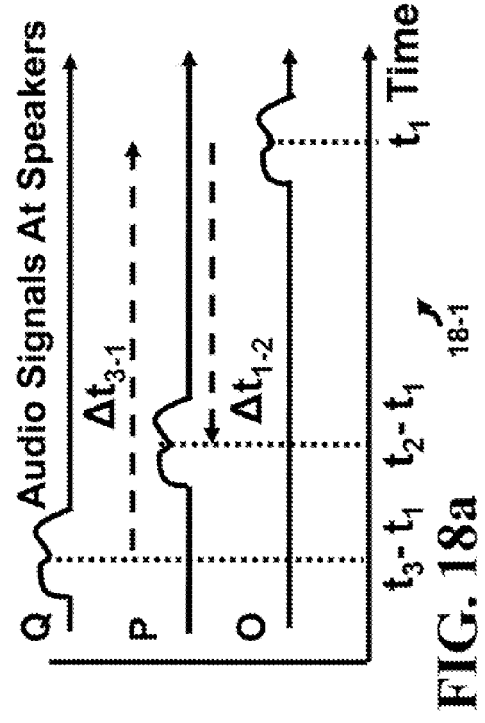
FIG. 18c shows the delay in space inserted into the audio signals illustrating this inventive technique.
Figure 18D:
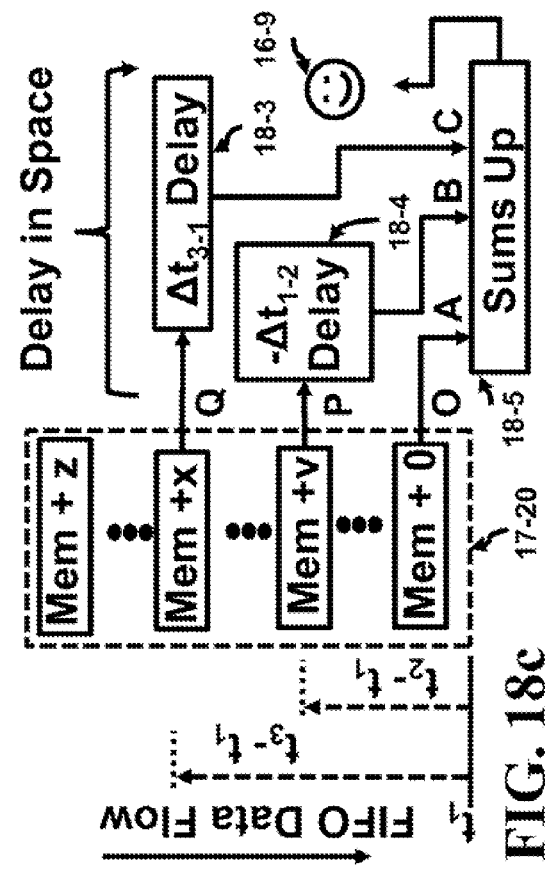
FIG. 18d depicts the audio delivery to the individual illustrating this inventive technique.

FIG. 18a illustrates 18-1 the outgoing audio signals Q, P and O at the speakers of the transceivers A, B and C, respectively. The correlators have already determined the time offsets that have been applied to the waveforms in FIG. 18a. As mentioned earlier, because of the propagation delay, these waveforms Q, P and O arrive at the individual simultaneously as illustrated 18-2 by the waveforms T, S and R, respectively in FIG. 18b. In FIG. 18c, the FIFO 17-20 is illustrated with the tap points and additional delays going to the transceivers at C, B and A. The FIFO data flow shown on the far left by the solid arrow while the determination of the time offset is illustrated next with relationship to $t_1$. The value of the maximum time is $t_3-t_1$ or $\Delta t_{3-1}$ delay 18-3 while the middle time is $t_2-t_1$ or $-\Delta t_{1-2}$ delay 18-4. The values of the maximum and minimum times tap into the delay line and an earlier point where the delay in space between the speaker and the individual makes up for the difference in time. The minimum time is $t_1$ or zero. The individual 16-9 sums up in block 18-5 the three audio waveforms of the audio signals R, S and T from the transceivers A, B and C, respectively. As illustrated in FIG. 18b, the speakers at the transceivers A, B and C generate a unifying waveform at position 16-12 for the individual 16-9 in FIG. 18d.

A timing diagram is shown in FIG. 19a for the situation where the individual 16-9 in FIG. 16e is at position 16-13. This timing diagram represents the waveforms of sound as they arrive at microphone of the audio transceivers A, B and C. The sound is generated by the individual 16-9 as the sound could include breathing, heartbeat, voice of the individual or any other noise that that particular individual may be making while being in the room. A noise floor for the waveforms L', M' and N' has been set as the reference point. Any noise below the noise floor will not be registered. The signal above the noise floor illustrates a triangular waveform, although any waveform can be used. Audio has frequencies that range from 20 Hz to 20,000 Hz while the audio carried over the telephone system ranges from 300 Hz to 3400 Hz has a reduced bandwidth. To simply the detection of the audio signal at the microphone, the bandwidth of the sound can be filtered after the microphone to a narrow band between 1000 Hz to 3000 Hz. The wavelength of the sound is related to velocity by: wavelength=(velocity)/(frequency). The wavelength of the sound for the narrow band ranges between 1000 Hz to 3000 Hz varies from 0.342 m to 0.116 m, well within the dimensions of a typical room. However, the system can be designed to encompass a wider bandwidth at but the expense of circuit complexity and cost would increase. In addition, the system can be further increased in complexity to account for reflections from surfaces.

All waveforms in FIG. 19a are delayed from the origin by the time interval $\Delta$. The first waveform for N' arrives at a delay time of $t_4$ which is equal to the time interval of $\Delta$ while the waveform for L' arrives at a delay of $t_5$ after a time offset of $-\Delta t_{4-5}$ later and finally the waveform for M' arrives at a delay of $t_6$ after a time offset $+\Delta t_{6-4}$ later. Finally, $t_5-t_6=-\Delta t_{5-6}$. These time offsets can be easily translated into distances to help triangulate the location of the source of the sound. These times are proportional to the distances by the equation: distance=(time)*(velocity of sound) which is used to determine the distances between the microphones and the individual. The position of the individual 16-9 with respect to the room is determined by the triangulation of these distances from the microphones. Once the distance of the individual from the microphones is known, the distances between the speakers and the individual are also known. These three different time offsets can be translated into distances based on the speed of sound in the room at a given temperature. These three distances can be used to triangulate the location of the source of the sound based on the distances relative to the audio transceivers at positions A, B and C that have detected the sound.

In FIG. 19b, a system 19-1 uses the several measured responses of sound (L', M' and N') at the microphones from a single source: the individual; and the system performs three correlations to determine the values of the time offsets, $-\Delta t_{4-5}$, $-\Delta t_{5-6}$, and $\Delta t_{6-4}$, respectively between the single source to the various audio transceivers. Correlator 1 correlates between waveform L' and waveform N', correlator 2 correlates between waveform M' and waveform L', and correlator 3 correlates between waveform N' and waveform M'. These time offsets are used by Max/MIN block 17-8 to find the maximum and minimum while the Mid Time block 17-9 determines the in-between time offset. After the correlators perform the measurements between these three waveforms, the latest waveform has the largest time offset 19-4 and is called the MAX time period. The earliest waveform has the shortest time offset 19-2 and is called the MIN time period. In addition, the time offset 19-3 of the middle or third waveform is called the MID time period and is determined from the data extracted from the three correlators within block Mid Time 17-9. The correlators, MAX/MIN and MID TIME blocks are part of a processor (not shown) that can be a microprocessor or a DSP.

These time period are presented to the tap point section of the FIFO carrying the audio data stream. The FIFO operates at a given frequency rate or (bytes, words)/sec. Knowing the delay time, the FIFO rate is multiplied by this delay time to determine how many bytes or words earlier the FIFFO must be tapped to extract the appropriate digital bit stream.

FIG. 19b be also illustrates the FIFO memory. This FIFO memory receives a second audio signal 15-20 delivered to the room that is eventually used to drive the speakers. The dashed arrow indicates the data flow along the FIFO and is illustrated in the downward direction. Alongside of the FIFO is the tap block that receives time information from the blocks 17-9 and 17-8 and works in conjunction with the FIFO to control the locations of the tap points of the FIFO. The blocks 17-9 and 17-8 provides the appropriate information to the tap block so that the appropriate tap points are set in the FIFO. For example, the maximum point, 19-4 is applied to the tap control TAP+Y 19-5 to control the tapping of the memory stream at MEM+Y 19-6. This tapped stream is applied to AMP B and then the speaker B where the path between the individual and speaker B is the longest. The minimum point 19-2 is applied to the tap control NOW 17-13 to control the tapping of the memory stream at MEM+0 17-14. This tapped stream is applied to AMP C and then to speaker C since the path between the individual and speaker C is the shortest. The middle point 19-3 is applied to the tap control TAP+W 19-7 to control the tapping of the memory stream at MEM+W 19-8. This tapped stream is applied to AMP A and then to speaker A since the path between the individual and speaker A is in between the longest and shortest distances. Cnt Vol block determines the volume necessary to get the power of the audio delivered to the individual correctly and sets the amplifiers: AMP A, AMP B and AMP C controlled by the Adjust Amp block. The sound generated by speakers in the transceivers A, B and C arrive at the location of the individual aligned in time and corrected for power variations thereby increasing the amplitude of the sound to the individual.

Figure 19C:
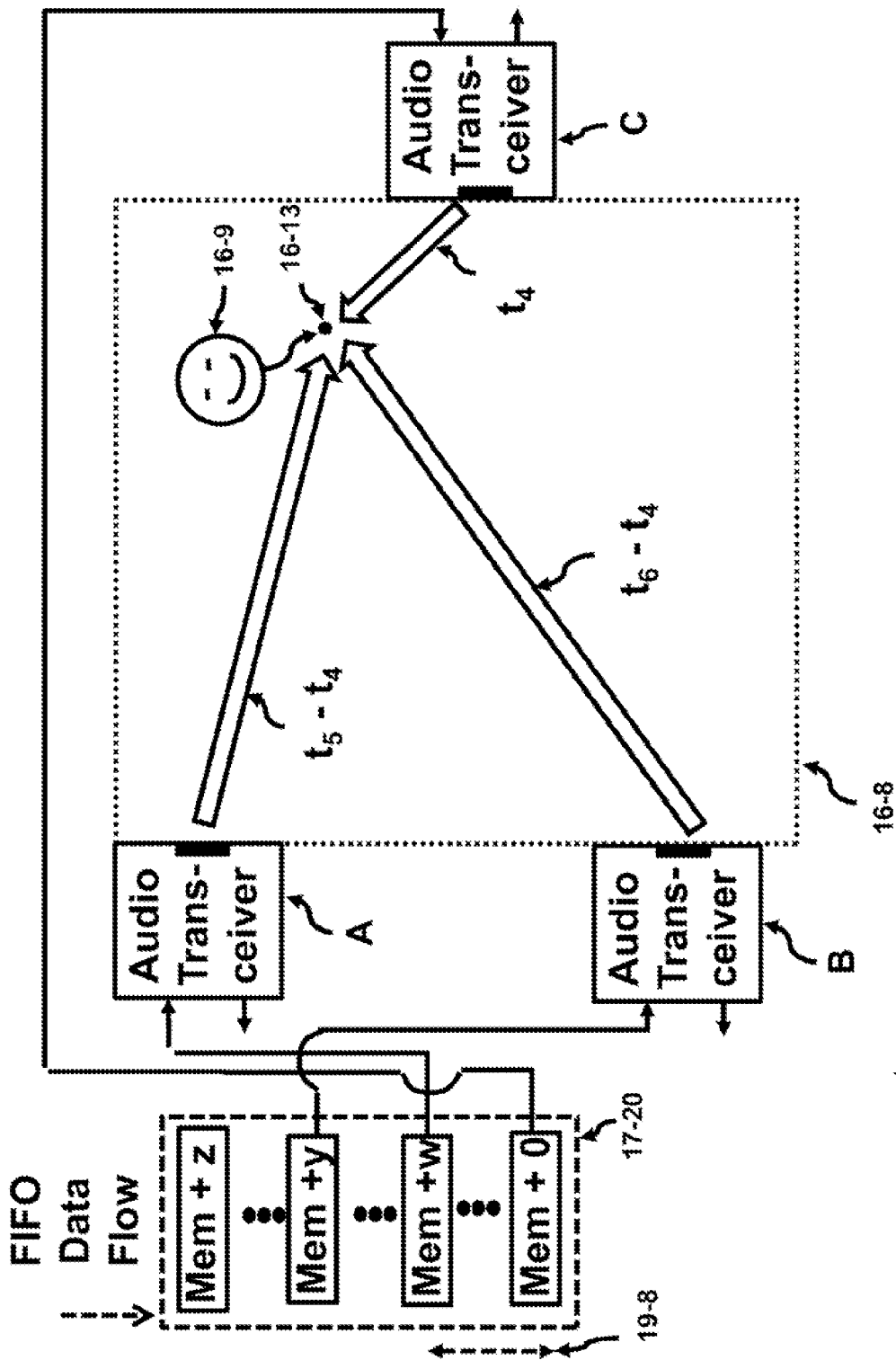
FIG. 19c illustrates the audio delivery to the individual illustrating this inventive technique.

FIG. 19c illustrates the case 19-7 of the individual 16-9 in the room 16-8, while being positioned at location 16-13, receiving the contents of the second audio data stream from the FIFO 17-20. The final output of the FIFO at MEM+0 is applied to the audio transceiver at C and after a period of time $t_4$ the sound of the minimum (final) output arrives at location 16-13. The middle tab point from MEM+W is applied to the audio transceiver at A and after a period of time $t_5-t_4$ the sound of the final output arrives at location 16-13. And finally, the maximum tab point from MEM+Y is applied to the audio transceiver at B and after a period of time $t_6-t_4$ the sound of the maximum output arrives at location 16-13. The individual 16-9 located at position 16-13 receives three aligned sound waveforms that reinforce one another.

Figure 20B:
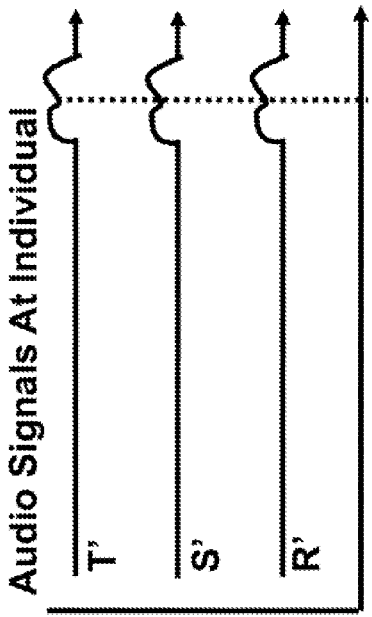
FIG. 20b shows the audio time diagrams after arriving at the individual from the different speakers in FIG. 18a illustrating this inventive technique.
Figure 20D:
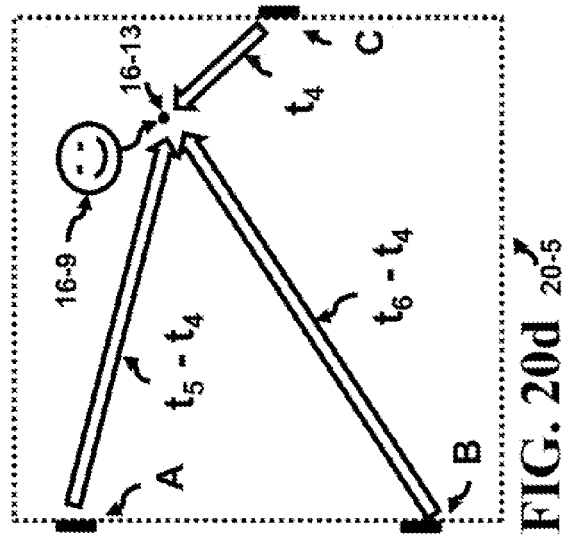
FIG. 20d depicts the audio delivery to the individual illustrating this inventive technique.
Figure 20A:
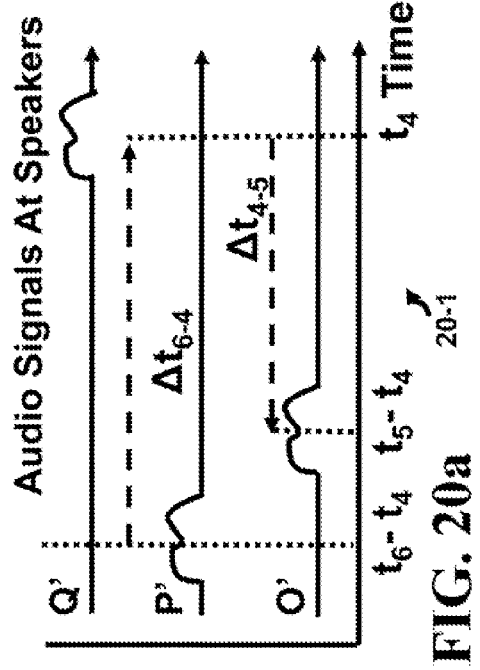
FIG. 20a shows the audio time diagrams at the speaker illustrating this inventive technique.
Figure 20C:
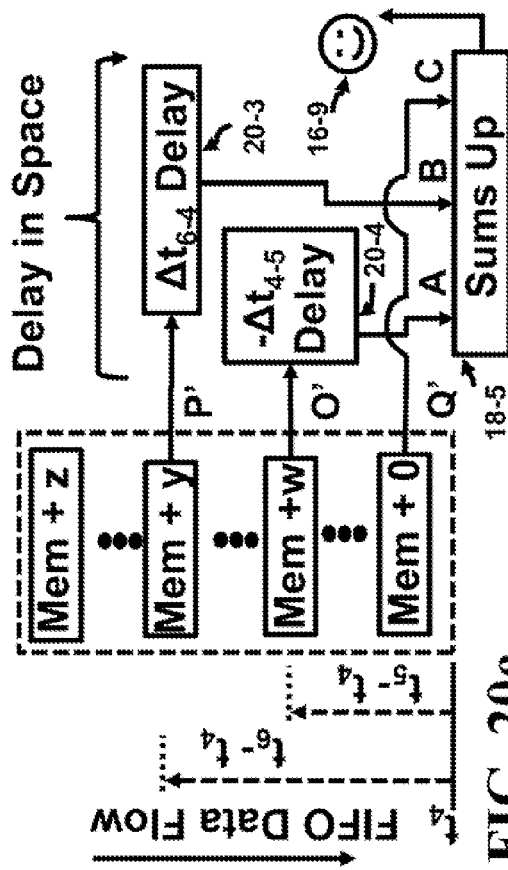
FIG. 20c shows the delay in space inserted into the audio signals illustrating this inventive technique.

FIG. 20a illustrates 20-1 the audio signals Q', P' and O' at the speakers of the transceivers B, C and A, respectively. The correlators have already determined the time offsets that have been applied to the waveforms in FIG. 20a. As mentioned earlier, because of the propagation delay, these waveforms Q', P' and O' arrive at the individual simultaneously as illustrated 20-2 by the waveforms T', S' and R', respectively in FIG. 20b. In FIG. 20c, the FIFO is illustrated with the tap points and additional delays going to the transceivers at C, B and A. The FIFO data flow shown on the far left by the solid arrow while the determination of the time offset is illustrated next with relationship to $t_4$. The value of the maximum time is $t_6-t_4$ or $\Delta t_{64}$ delay 20-3 while the middle time is $t_5-t_4$ or $-\Delta t_{4-5}$ delay 20-4. The values of the maximum and minimum times tap into the delay line and an earlier point where the delay in space between the speaker and the individual makes up for the difference in time. The minimum time is $t_4$ or zero. The individual 16-9 sums up in block 18-5 the three audio waveforms of the audio signals R', S' and T' from the transceivers A, B and C, respectively. As illustrated in FIG. 20b, the speakers at the transceivers A, B and C generate a unifying waveform at position 16-13 for the individual 16-9 in FIG. 20d.

Figure 21:
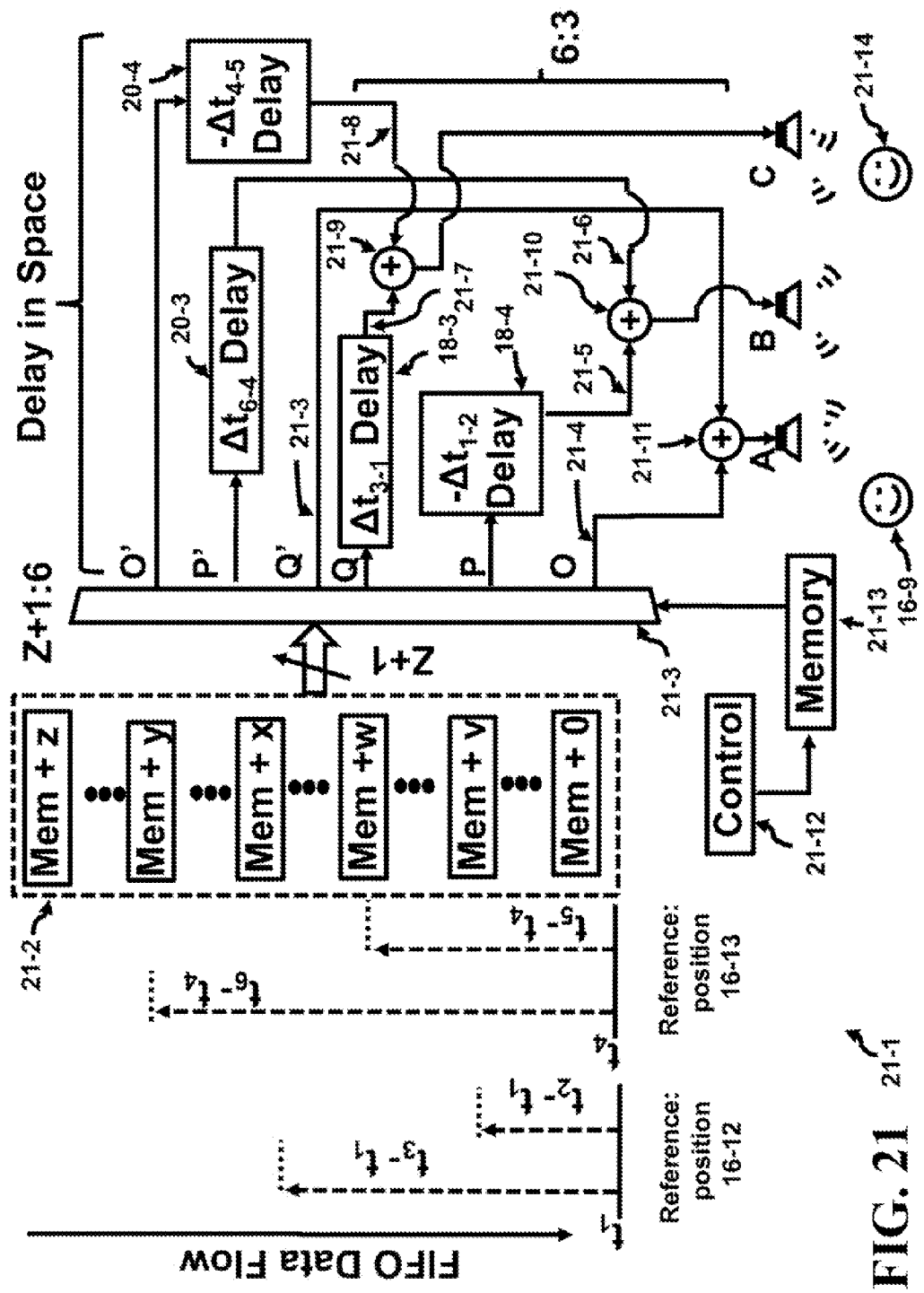
FIG. 21 depicts the delay in space inserted to both individuals into the audio signals in accordance with the present invention.

FIG. 21 illustrates a system 21-1 where the FIFO 21-2 contains the tap off points for the reference position 16-12 and position 16-13 within the single FIFO. The delay $t_1$ and the delay $t_4$ were both measured with respect to the end or the final output of the FIFO 21-2. A first individual 16-9 is located at position 16-12 and a second individual 21-14 is located at position 16-13. The tap points are determined for one individual while the second individual is silent and vice versa. This is like a TDM (Time Division Multiplexing) scheme where each individual takes a turn to determine the tap points. The additional points for the position 16-12 refer to MEM+X and MEM+V while those for position 16-13 refers to MEM+Y and MEM+W. These points are tapped in the FIFO and sent to the selector 21-3 which is a Z:6 (Z inputs to six outputs) decoder. In the "delay in space", the delays 18-3, 18-4, 20-3 and 20-4 are added as required to one of the 6 waveforms. Two of the waveforms have zero delay added. Then, 3 sets of pairs of waveforms (21-4 and 21-3), (21-5 and 21-6) and (21-7 and 21-8) are added by adders 21-11, 21-10 and 21-9, respectively. The adders contain the necessary components such as D/A's to convert the digital signals to analog signals before adding, the two waveforms. Once the waveforms are added, the three composite signals are the output audio signals that are provided to the three speakers in transceivers A, B and C. This system maximizes or reinforces the signal simultaneously to the both individuals 16-9 and 21-14 located at locations 16-12 and 16-13, respectively. The control 21-12 and memory 21-13 determine what the Z value of the Z+1:6 decoder of the FIFO should be based on the correlations determined earlier.

An apparatus is described that can monitor the sounds and voices of infants and children in a house by judicially placing nodes in key locations of the home. The network has intelligence and uses voice recognition to enable, disable, reroute, or alter the network. The network uses voice recognition to follow a child from node to node, monitors the children according to activity and uses memory to delay the voices so the adult can hear the individual conversations. An adult that has been assigned privilege can disable all nodes from any node in the network. Another apparatus can locate an individual by voice recognition or sounds they emit including walking, breathing and even a heartbeat. The sound is detected at several microphones that have a specific positional relationship to a room or an enclosure. Triangulations of the time differences of the audio signal detected by the microphones are used to determine the location or position of the audio source in the room. This information can be used to provide an improved audio delivery system to the individual.

Finally, it is understood that the above description is only illustrative of the principles of the current invention. It is understood that the various embodiments of the invention, although different, are not mutually exclusive. In accordance with these principles, those skilled in the art may devise numerous modifications without departing from the spirit and scope of the invention. The network can have at least one processor comprising a CPU (Central Processing Unit), microprocessor, multi-core-processor, DSP, a front end processor, or a co-processor. These processors are used to provide the full system requirements to manipulate the signals as required. The transceiver, although not shown, has components the typical components such as, LNA, filters, mixers, amplifiers, switches, etc. Node K refers that the transceiver is in the Kitchen, the node P corresponds to the one in the Playroom, etc. So if a child is at node K, the child is in the Kitchen. An individual can comprise a human of any age: an infant, a baby, a toddler, a child, a teenager, an adult, a person, an elderly person. All of the supporting elements to operate these processors (memory, disks, monitors, keyboards, power supplies, etc), although not necessarily shown, are known by those skilled in the art for the operation of the entire system.

What is claimed is:

1. An intelligent network comprising:
   a first node of a plurality of nodes assigned as a master node;
   all remaining nodes of said plurality of nodes assigned as slave nodes;

said master node coupled by a direct bidirectional link to each one of said slave nodes, wherein each said slave node exclusively communicates information with another slave node through said master node;

one of said slave nodes assigned by said intelligent network as a current master node;

said first node assigned by said intelligent network as a new slave node; and said current master node coupled by a new direct bidirectional link to each of said slave nodes.

2. The intelligent network of claim 1, wherein any one of said slave nodes communicates indirectly to any remaining slave node of said slave nodes through said current master node.

3. The intelligent network of claim 1, wherein said intelligent network issues an assignment and said current master node notifies all of said slave nodes of said assignment.

4. The intelligent network of claim 3, wherein said assignment selects a newly assigned master node from one of said slave nodes closest to a user.

5. The intelligent network of claim 4, wherein said assignment also assigns said current master node as one of said slave nodes.

6. The intelligent network of claim 1, wherein any one of said slave nodes not actively communicating can be powered down to save power.

7. The intelligent network of claim 1, wherein said current master node is assigned by sounds emanating from an individual within said intelligent network.

8. An intelligent network of a plurality of nodes comprising:

one of said plurality of nodes assigned as a master node;

all remaining nodes of said plurality of nodes assigned as slave nodes;

a direct bidirectional link couples said master node to each one of said slave nodes;

an indirect bidirectional link couples each said slave node to any other slave node, wherein each said slave node communicates information exclusively with another slave node through said master node;

a node assignment is distributed by said intelligent network to all nodes;

one of said slave nodes is assigned as a new master node by said node assignment;

said master node is assigned as a new slave node by said node assignment; and a new direct bidirectional link couples said new master node to each one of said slave nodes.

9. The intelligent network of claim 8, wherein any one of said slave nodes communicates indirectly to any remaining slave node of said slave nodes through said new master node.

10. The intelligent network of claim 8, wherein said intelligent network issues a new node assignment and said new master node notifies all of said slave nodes of said new node assignment.

11. The intelligent network of claim 10, wherein said new node assignment assigns a newer master node from one of said slave nodes.

12. The intelligent network of claim 11, wherein said new node assignment also assigns said new master node as one of said slave nodes.

13. The intelligent network of claim 8, wherein any one of said slave nodes not actively communicating can be powered down to save power.

14. The intelligent network of claim 8, wherein said node assignment is determined by sounds emanating from an individual within said intelligent network.

* * * * *